US011849328B2

(12) United States Patent
Robert

(10) Patent No.: US 11,849,328 B2
(45) Date of Patent: Dec. 19, 2023

(54) TRUST EXTENSION IN A SECURE COMMUNICATION FRAMEWORK

(71) Applicant: Wire Swiss GmbH, Zug (CH)

(72) Inventor: Raphael Robert, Berlin (DE)

(73) Assignee: Wire Swiss GmbH, Zug (CH)

( * ) Notice: Subject to any disclaimer, the term of this patent is extended or adjusted under 35 U.S.C. 154(b) by 0 days.

(21) Appl. No.: 16/979,838

(22) PCT Filed: Mar. 14, 2019

(86) PCT No.: PCT/EP2019/056376
§ 371 (c)(1),
(2) Date: Sep. 10, 2020

(87) PCT Pub. No.: WO2019/175295
PCT Pub. Date: Sep. 19, 2019

(65) Prior Publication Data
US 2021/0044968 A1  Feb. 11, 2021

Related U.S. Application Data

(60) Provisional application No. 62/643,833, filed on Mar. 16, 2018, provisional application No. 62/644,244, filed on Mar. 16, 2018.

(51) Int. Cl.
*H04W 12/55* (2021.01)
*H04L 9/40* (2022.01)

(52) U.S. Cl.
CPC ........... *H04W 12/55* (2021.01); *H04L 63/104* (2013.01)

(58) Field of Classification Search
CPC ................. H04W 12/50–55; H04L 63/10–108
See application file for complete search history.

(56) References Cited

U.S. PATENT DOCUMENTS 8,539,225 B2    9/2013  Guo et al.
9,819,905 B1 *  11/2017 Breitbard ............ H04L 65/1069
(Continued)

FOREIGN PATENT DOCUMENTS

EP      2269361 A1      1/2011
EP      3182666 A1      6/2017
WO   WO-2016019488 A1 *  2/2016  ................ H04L 9/32

OTHER PUBLICATIONS

Quercia, Daniele, Stephen Hailes, and Licia Capra. "Lightweight distributed trust propagation." Seventh IEEE International Conference on Data Mining (ICDM 2007). IEEE, 2007. (Year: 2007).*

(Continued)

*Primary Examiner* — Madhuri R Herzog
(74) *Attorney, Agent, or Firm* — Siritzky Law, PLLC

(57) ABSTRACT

A computer-implemented method, in a communication framework in which each of a plurality of users has one or more devices associated therewith, and in which the users use at least some of their devices to communicate via a backend system. A first user has a first set of first one or more associated trusted devices, and a second user has a second set of second one or more trusted devices associated therewith. The first user forms a first trust relationship between a first device in the first set and a second device in the second set. Based on (i) the first trust relationship, and (ii) the second set associated with the second user, the first user forms a second trust relationship between each device in the first set and each device in the second set. A least one device in the first set communicates with one or more devices in the second set based on the second trust relationship.

23 Claims, 14 Drawing Sheets

(56) References Cited

U.S. PATENT DOCUMENTS

| | | | |
|---|---|---|---|
| 10,003,577 B2 | 6/2018 | Jakobi et al. | |
| 10,652,323 B2* | 5/2020 | Lochan | H04L 67/06 |
| 2006/0090067 A1* | 4/2006 | Edmonds | H04L 67/104 |
| | | | 713/159 |
| 2007/0055877 A1* | 3/2007 | Persson | H04L 63/0442 |
| | | | 713/171 |
| 2013/0028252 A1* | 1/2013 | Booton | H04M 7/0012 |
| | | | 370/352 |
| 2014/0165165 A1 | 6/2014 | Story, Jr. | |
| 2016/0072778 A1* | 3/2016 | Panton | H04L 63/061 |
| | | | 713/171 |
| 2018/0367535 A1* | 12/2018 | Liao | H04W 76/10 |
| 2022/0131858 A1* | 4/2022 | Short, III | H04L 63/0428 |

OTHER PUBLICATIONS

Canadian Intellectual Property Office (CIPO), Office Action in Canadian Patent Application No. 3,093,869, dated Sep. 21, 2021 [5pgs.].

European Patent Office (EPO), Amended claims filed after receipt of (European) search report in European Patent Application No. 19711329.3, dated May 3, 2021 [19 pgs.].

EPO, European Search Report received in European Application No. 19711329.3, dated Oct. 23, 2020, (3p.).

EPO, Response to European Search Report received in European Application No. 19711329.3, dated May 3, 2021, (12p.).

WIPO, International Search Report received in International Application No. PCT/EP2019/056376, dated Apr. 16, 2019, (3p.).

WIPO, International Written Opinion received in International Application No. PCT/EP2019/056376, dated Apr. 16, 2019, (10p.).

WIPO, International Preliminary Report on Patentability received in International Application No. PCT/EP2019/056376, dated Sep. 22, 2020, (11p.).

European Patent Office (EPO), Amended claims filed by applicant in European Patent Application No. 19711329.3, dated Sep. 29, 2022 [3 pgs.].

European Patent Office (EPO), Reply (by applicant) to communication from the Examining Division, in European Patent Application No. 19711329.3, dated Sep. 29, 2022 [11 pgs.].

European Patent Office (EPO), Communication from the Examining Division (dated Mar. 22, 2022), in European Patent Application No. 19711329.3, dated Sep. 29, 2022 [6 pgs.].

* cited by examiner

123
VERIFICATION / CERTIFICATE DATA

400 CERTFICATE(S)

402 CERTIFICATE

404 KEY(S)

406 PUBLIC KEY(S)

408 PRIVATE KEY(S)

410 JOURNAL

412 JOURNAL ENTRY

412 JOURNAL ENTRY

412 JOURNAL ENTRY (FIG. 4B)

FIG. 4A

```
pub struct journalEntry {
    pub format_version: u32,            // version of the data format of an entry
    pub journal_id: u32,                // version of the current journal ID
    pub history_hash: Digest,           // hash over previous versions
    pub extension_hash: Digest,         // hash over the entry extension
    pub count: u32,                     // incremental version number, starts at 0
    pub operation: EntryType,           // delete = 0, add = 1
    pub capabilities: u32,              // capabilities of a device
    pub subject_publickey: PublicKey,   // public key of the subject device
    pub issuer_publickey: PublicKey,    // public key of the issuer device
    pub subject_signature: Signature,   // signature of the subject
    pub issuer_signature: Signature,    // signature of the issuer
}
```

FIG. 4C

TRUST EXTENSION IN A SECURE COMMUNICATION FRAMEWORK

RELATED APPLICATIONS

This application is a 371 of International application PCT/EP2019/056376, filed Mar. 14, 2019, the entire contents of which are hereby fully incorporated herein by reference for all purposes. PCT/EP2019/056376 is related to and claims the benefit of (i) U.S. Patent Application No. 62/643,833, filed Mar. 16, 2018; and (ii) U.S. Patent Application No. 62/644,244, filed Mar. 16, 2018, the entire contents of both of which are hereby fully incorporated herein by reference for all purposes.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

This invention relates to a communication framework, and, more particularly, to simplifying device verification in a secure communication framework.

Background

Much of today's communication takes place via computers and computing devices, including so-called smartphones. In many parts of the world, computer-based interparty communication has superseded POTS systems. Much of today's computer-based communication is built on existing protocols that were designed to provide simple messages between pairs of devices on homogeneous networks.

U.S. Pat. No. 9,787,631 (the entire contents of which are hereby fully incorporated herein by reference for all purposes), describes, inter alia, an exemplary unified and consistent multimodal communication framework. In such a communication framework, each user may have more than one device, and the communication framework provides and supports conversations between multiple users and over multiple heterogeneous devices.

In order to provide secure and trusted communication in a conversation between users, each device associated with the conversation must be trusted by each other device in the conversation. This means that each device of each user in a conversation, must be securely paired with each other device of each other user in the conversation, where the pairing of two devices establishes a trusted relationship between the devices. This pairing also needs to take place between any devices that join a conversation after initial trust pairing occurs. Furthermore, this secure pairing should take place between user's devices even if those devices are not active in the conversation.

It is desirable to provide a system that simplifies verification, trust-pairing of devices, and trust extension in a communication framework.

SUMMARY

The present invention is specified in the claims as well as in the description.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method including: (A) forming a first trust relationship between a first device in a first set and a second device in a second set, where the first set includes a first one or more trusted devices associated with a first user of a plurality of users, and where the second set includes a second one or more trusted devices associated with a second user of the plurality of users. The computer-implemented method also includes (B) based on (i) the first trust relationship, and (ii) the second set associated with the second user, forming a second trust relationship between at least one device in the first set and at least one device in the second set. The computer-implemented method also includes: (C) at least one device in the first set communicating with one or more devices in the second set, the communicating based on the second trust relationship. Other embodiments or implementations of this aspect include corresponding computer systems, apparatus, and computer programs recorded on one or more computer storage devices, each configured to perform the actions of the methods.

Embodiments or implementations may include one or more of the following features:
  The method in which users use at least some of their devices to communicate via a backend system.
  The method where the first user forms the first trust relationship and the second trust relationship.
  The method where the second trust relationship is formed between each device in the first set and each device in the second set.
  The method further including adding a new device to the first set; and the new device in the first set communicating with one or more devices in the second set, the communicating based on the second trust relationship.
  The method where the adding a new device includes the new device forming a trust relationship with at least one device already in the first set.
  The method including, after adding the new device to the first set, at least one device in the second set communicating with one or more devices in the first set, the communicating based on the second trust relationship.
  The method further including removing an existing device from the first set, where, in response to the removing, the existing device is removed from the trust relationship with the second set.
  The method further including, after removing an existing device from the first set, at least one device in the second set communicating with one or more devices in the first set, the communicating based on the second trust relationship.
  The method where the first set and the second set are maintained in the backend system.
  The method where at least one set of one or more trusted devices associated with a particular user is maintained as a particular journal in the backend system.

The method where each particular set of one or more trusted devices associated with the particular user is maintained as the particular journal in the backend system.

The method where the particular journal associated with a particular user includes a history of devices associated with the particular user.

The method where the history of devices associated with the particular user includes a list of (i) at least some devices added to the particular set associated with the particular user; and (ii) at least some devices removed from the particular set associated with the particular user.

The method where the history of devices associated with the particular user includes a list of (i) all devices added to the particular set associated with the particular user; and (ii) all devices removed from the particular set associated with the particular user.

The method where the first set of the first one or more trusted devices associated with the first user is maintained as a first journal in the backend system, and where the second set of the second one or more trusted devices associated with the second user is maintained as a second journal in the backend system, and where, the at least one device in the first set uses the second journal for at least some communicating.

The method where the at least one device in the first set uses information in the second journal to determine which devices of the second user to trust.

The method further including at least one device in the second set communicating with one or more devices in the first set, the communicating based on the second trust relationship.

The method where, for at least some communicating, the at least one device in the second set uses information in the first journal to determine which devices of the second user to trust.

The method operable in a communication framework in which each of the plurality of users has one or more devices associated therewith.

The method wherein the devices are selected from a group comprising: a computing device, a computer, a mobile phone, a cellular phone, a tablet computer, a desktop computer, a laptop computer, and a set-top box.

One general aspect includes a computer-implemented method, operable in a communication framework in which each of a plurality of users has one or more devices associated therewith, and in which users use at least some of their devices to communicate via a backend system. The computer-implemented method also includes where a first set of first one or more trusted devices is associated with a first user of the plurality of users, and where a second set of second one or more trusted devices associated with a second user of the plurality of users.

The computer-implemented method also includes (a) the first user forming a first trust relationship between a first device in the first set and a second device in the second set. The computer-implemented method also includes (b) based on (i) the first trust relationship, and (ii) the second set associated with the second user, the first user forming a second trust relationship between at least one device in the first set and at least one device in the second set. The computer-implemented method also includes (c) at least one device in the first set communicating with one or more devices in the second set, the communicating based on the second trust relationship. Other embodiments of this aspect include corresponding computer systems, apparatus, and computer programs recorded on one or more computer storage devices, each configured to perform the actions of the methods.

Embodiments or implementations may include one or more of the following features:

The method where the first user forms the second trust relationship between each device in the first set and each device in the second set.

The method further including: the first user removing an existing device from the first set, where, in response to the removing, the existing device is removed from the trust relationship with the second set.

The method further including: at least one device in the second set communicating with one or more devices in the first set, the communicating based on the second trust relationship.

The method where the first set of first one or more trusted devices associated with the first user and the second set of first one or more trusted devices associated with the second user are maintained in the backend system.

The method where at least one set of one or more trusted devices associated with a particular user is maintained as a particular journal in the backend system.

The method where each particular set of one or more trusted devices associated with the particular user is maintained as the particular journal in the backend system.

The method where the particular journal associated with a particular user includes a history of devices associated with the particular user.

The method where the history of devices associated with the particular user includes a list of (i) at least some devices added to the particular set associated with the particular user; and (ii) at least some devices removed from the particular set associated with the particular user.

The method where the history of devices associated with the particular user includes a list of (i) all devices added to the particular set associated with the particular user; and (ii) all devices removed from the particular set associated with the particular user.

The method where the first set of first one or more trusted devices associated with the first user is maintained as a first journal in the backend system, and where the second set of second one or more trusted devices associated with the second user is maintained as a second journal in the backend system, and where, for the communicating in (c), the at least one device in the first set uses the second journal.

The method where the at least one device in the first set uses information in the second journal to determine which devices of the second user to trust.

The method further including: at least one device in the second set communicating with one or more devices in the first set, the communicating based on the second trust relationship.

The method where, for the communicating in (d), the at least one device in the second set uses information in the first journal to determine which devices of the second user to trust.

The method further including: the first user adding a new device to the first set.

The method where the new device in the first set communicating with one or more devices in the second set, the communicating based on the second trust relationship.

The method where the adding in includes the new device forming a trust relationship with at least one device already in the first set.

The method wherein the devices are selected from a group comprising: a computing device, a computer, a mobile phone, a cellular phone, a tablet computer, a desktop computer, a laptop computer, and a set-top box.

Embodiments or implementations of the described techniques may include hardware, a method or process, or computer software on a computer-accessible medium.

One general aspect includes an article of manufacture including a computer-readable medium having program instructions stored thereon, the program instructions, operable on a device and, when executed by a processor on the device, cause the processor to: perform any of the methods/embodiments/implementations listed above. Embodiments or implementations may include where the computer-readable medium is non-transient.

One general aspect includes a device, including hardware including at least one processor and at least one memory, the device programmed to perform any of the methods/embodiments/implementations listed above.

Embodiments or implementations may include where the device is selected from: a computing device, a computer, a mobile phone, a cellular phone, a tablet computer, a desktop computer, a laptop computer, and a set-top box.

Below is a list of method (or process) embodiments. Those will be indicated with a letter "M". Whenever such embodiments are referred to, this will be done by referring to "M" embodiments.

M1. A computer-implemented method comprising:
(A) forming a first trust relationship between a first device in a first set and a second device in a second set, wherein the first set comprises a first one or more trusted devices associated with a first user of a plurality of users, and wherein the second set comprises a second one or more trusted devices associated with a second user of the plurality of users;
(B) based on (i) the first trust relationship, and (ii) the second set associated with the second user, forming a second trust relationship between at least one device in the first set and at least one device in the second set; and
(C) at least one device in the first set communicating with one or more devices in the second set, the communicating based on the second trust relationship.

M2. The method of embodiment M1, in which users use at least some of their devices to communicate via a backend system.

M3. The method of any of embodiments M1 or M2, wherein the first user forms the first trust relationship in (A) and the second trust relationship in (B).

M4. The method of any of embodiments M1 to M3, wherein, in (B), the second trust relationship is formed between each device in the first set and each device in the second set.

M5. The method of any of embodiments M1 to M4, further comprising:
(D) adding a new device to the first set; and
(E) the new device in the first set communicating with one or more devices in the second set, the communicating based on the second trust relationship.

M6. The method of embodiment(s) M5 wherein the adding in (D) comprises the new device forming a trust relationship with at least one device already in the first set.

M7. The method of any of embodiments M5-M6, further comprising, after adding the new device to the first set in (D), (G) at least one device in the second set communicating with one or more devices in the first set, the communicating based on the second trust relationship.

M8. The method of any of embodiments M1 to M7, further comprising:
(F) removing an existing device from the first set, wherein, in response to the removing, the existing device is removed from the trust relationship with the second set.

M9. The method of embodiment(s) M8, further comprising, after removing the existing device from the first set in (F),
(G) at least one device in the second set communicating with one or more devices in the first set, the communicating based on the second trust relationship.

M10. The method of any of embodiments M1 to M9, wherein the first set and the second set are maintained in the backend system.

M11. The method of any of embodiments M1 to M10, wherein at least one set of one or more trusted devices associated with a particular user is maintained as a particular journal in the backend system.

M12. The method of any of embodiments M1 to M11 wherein each particular set of one or more trusted devices associated with the particular user is maintained as the particular journal in the backend system.

M13. The method of any of embodiments M1 to M12, wherein the particular journal associated with a particular user comprises a history of devices associated with the particular user.

M14. The method of any of embodiments M1 to M13, wherein the history of devices associated with the particular user includes a list of (i) at least some devices added to the particular set associated with the particular user; and (ii) at least some devices removed from the particular set associated with the particular user.

M15. The method of any of embodiments M1 to M14, wherein the history of devices associated with the particular user includes a list of (i) all devices added to the particular set associated with the particular user; and (ii) all devices removed from the particular set associated with the particular user.

M16. The method of any of embodiments M1 to M15, wherein the first set of the first one or more trusted devices associated with the first user is maintained as a first journal in the backend system, and wherein the second set of the second one or more trusted devices associated with the second user is maintained as a second journal in the backend system, and wherein, for the communicating in (C), the at least one device in the first set uses the second journal.

M17. The method of any of embodiment(s) M16, wherein the at least one device in the first set uses information in the second journal to determine which devices of the second user to trust.

M18. The method of any of embodiments M1 to M16, further comprising: (D) at least one device in the second set communicating with one or more devices in the first set, the communicating based on the second trust relationship.

M19. The method of embodiment(s) M18, wherein, for the communicating in (D), the at least one device in the second set uses information in the first journal to determine which devices of the second user to trust.

M20. The method of any of embodiments M1 to M19, operable in a communication framework in which each of the plurality of users has one or more devices associated therewith.

M21. A computer-implemented method, operable in a communication framework in which each of a plurality of users has one or more devices associated therewith, and in which users use at least some of their devices to communicate via a backend system, wherein a first set of first one or more trusted devices is associated with a first user of the plurality of users, and wherein a second set of second one or more trusted devices associated with a second user of the plurality of users,
the method comprising:
(A) the first user forming a first trust relationship between a first device in the first set and a second device in the second set;
(B) based on (i) the first trust relationship, and (ii) the second set associated with the second user, the first user forming a second trust relationship between at least one device in the first set and at least one device in the second set; and
(C) at least one device in the first set communicating with one or more devices in the second set, the communicating based on the second trust relationship.

M22. The method of embodiment M21, wherein, in (B), the first user forms the second trust relationship between each device in the first set and each device in the second set.

M23. The method of any of the embodiments M21-M22, further comprising:
(D) the first user adding a new device to the first set; and
(E) the new device in the first set communicating with one or more devices in the second set, the communicating based on the second trust relationship.

M24. The method of the embodiment(s) M23 wherein the adding in (D) comprises the new device forming a trust relationship with at least one device already in the first set.

M25. The method of any of the embodiments M21-M24, further comprising: (F) the first user removing an existing device from the first set, wherein, in response to the removing, the existing device is removed from the trust relationship with the second set.

M26. The method of any of the embodiments M21-M25, further comprising: at least one device in the second set communicating with one or more devices in the first set, the communicating based on the second trust relationship.

M27. The method of any of the embodiments M21-M26, wherein the first set of first one or more trusted devices associated with the first user and the second set of first one or more trusted devices associated with the second user are maintained in the backend system.

M28. The method of any of the embodiments M21-M27, wherein at least one set of one or more trusted devices associated with a particular user is maintained as a particular journal in the backend system.

M29. The method of any of the embodiments M21-M28, wherein each particular set of one or more trusted devices associated with the particular user is maintained as a particular journal in the backend system.

M30. The method of any of the embodiments M21-M29 wherein the particular journal associated with a particular user comprises a history of devices associated with the particular user.

M31. The method of any of the embodiments M21-M30 wherein the history of devices associated with the particular user includes a list of (i) at least some devices added to the particular set associated with the particular user; and (ii) at least some devices removed from the particular set associated with the particular user.

M32. The method of any of the embodiments M21-M31 wherein the history of devices associated with the particular user includes a list of (i) all devices added to the particular set associated with the particular user; and (ii) all devices removed from the particular set associated with the particular user.

M33. The method of any of the embodiments M21-M32 wherein the first set of first one or more trusted devices associated with the first user is maintained as a first journal in the backend system, and wherein the second set of second one or more trusted devices associated with the second user is maintained as a second journal in the backend system, and wherein, for the communicating in (C), the at least one device in the first set uses the second journal.

M34. The method of any of the embodiments M21-M33 wherein the at least one device in the first set uses information in the second journal to determine which devices of the second user to trust.

M35. The method of any of the embodiments M1-M34, further comprising: at least one device in the second set communicating with one or more devices in the first set, the communicating based on the second trust relationship.

M36. The method of embodiment(s) M35, wherein, for the communicating, the at least one device in the second set uses information in the first journal to determine which devices of the second user to trust.

M37. The method of any of the embodiments M1-M36, wherein the devices are selected from a group comprising: a computing device, a computer, a mobile phone, a cellular phone, a tablet computer, a desktop computer, a laptop computer, and a set-top box.

Below is a list of article of manufacture embodiments. Those will be indicated with a letter "A". Whenever such embodiments are referred to, this will be done by referring to "A" embodiments.

A38. An article of manufacture comprising a computer-readable medium having program instructions stored thereon, the program instructions, operable on a device and, when executed by a processor on the device, cause the processor to: perform the method of any of the embodiments M1-M37.

A39. The article of manufacture of any of the embodiments A38, wherein the computer-readable medium is non-transient.

Below is a list of device embodiments. Those will be indicated with a letter "D". Whenever such embodiments are referred to, this will be done by referring to "D" embodiments.

D40. A device, including hardware including at least one processor and at least one memory, the device programmed to perform the method of any one of any of the embodiments M1-M37.

D41. The device of embodiments D40, wherein the device is selected from: a computing device, a computer, a mobile phone, a cellular phone, a tablet computer, a desktop computer, a laptop computer, and a set-top box.

The above features along with additional details of the invention, are described further in the examples herein, which are intended to further illustrate the invention but are not intended to limit its scope in any way.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 4A-4C depict aspects of data and data structures according to exemplary embodiments hereof;

DETAILED DESCRIPTION OF THE PRESENTLY PREFERRED EXEMPLARY EMBODIMENTS

Glossary and Abbreviations

As used herein, unless used otherwise, the following terms or abbreviations have the following meanings:
CA means Certificate Authority;
CDDL means Concise data definition language;
CBOR means Concise Binary Object Representation;
DTLS mean Datagram Transport Layer Security;
HMAC means hash message authentication code;
ICE means Interactive Connectivity Establishment;
KASE means Key Agreement Signaling Extension;
POTS means Plain old telephone service;
SAS means Short Authentication String;
SRTP means Secure Real-time Transport Protocol;
SDP means Session Description Protocol;
UUID means Universal Unique Identifier;
WebRTC means Web Real-Time Communication;
ZRTP (composed of Z and Real-time Transport Protocol) is a cryptographic key-agreement protocol to negotiate the keys for encryption between two end points.

An interaction between a set of one or more users is referred to herein as a "conversation."

A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

Background & Overview
Overview—Structure

Figure 1:
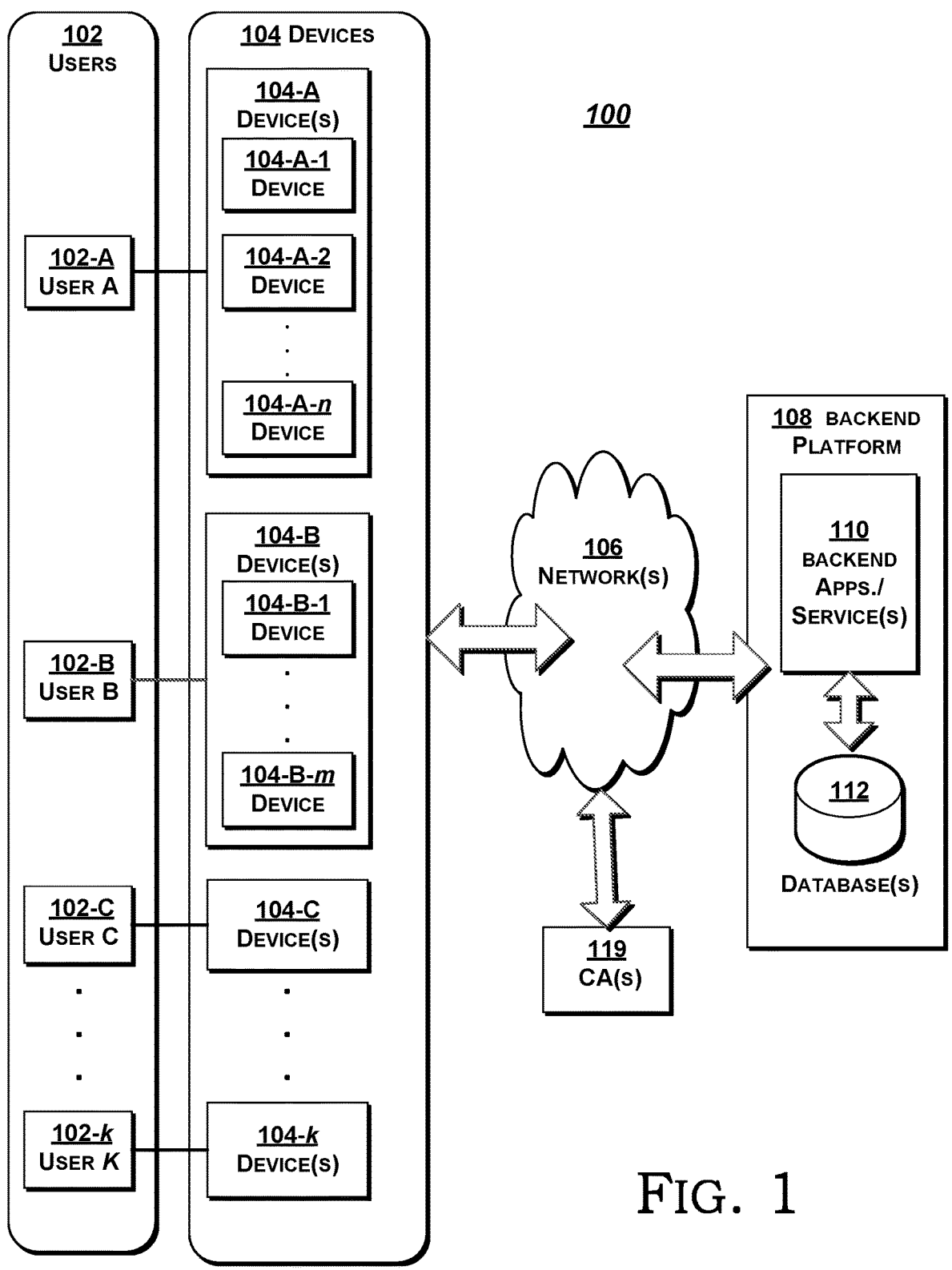
FIG. 1 shows an overview of a framework for communications in accordance with exemplary embodiments hereof.

FIG. 1 shows an overview of a communication framework 100 for a unified and consistent communications system according to exemplary embodiments hereof. Within the communication framework 100, a user 102 may have one or more devices 104 associated therewith. For example, as shown in FIG. 1, user 102-A has device(s) 104-A (comprising devices 104-A-1, 104-A-2 . . . 104-A-n) associated therewith. Similarly, user 102-B has device(s) 104-B (comprising devices 104-B-1 . . . 104-A-m) associated therewith. The term "account" is sometimes used herein synonymously with "user."

A user/account 102 may not correspond to a person or human, and a user 102 may be any entity (e.g., a person, a corporation, a school, etc.).

The association between the users and their devices is depicted in the drawing by the lines connecting each user 102 with the corresponding devices 104 associated with that user. Although only four user/device associations are shown in the drawing, it should be appreciated that a particular system may have an arbitrary number of users, each with an arbitrary number of devices. A presently preferred implementation supports up to eight (8) devices per user.

A particular user/device association may change over time, and a particular device may be associated with multiple users (for example, multiple users may share a computer).

Users 102 may use their associated device(s) 104 to communicate with each other within the communication framework 100. A user's device(s) may communicate with one or more other users' device(s) via network(s) 106 and a backend platform 108 (also referred to as backend 108) using one or more backend applications 110. The backend 108 (e.g., using backend application(s) 110) may maintain information in one or more databases 112, and preferably acts as a persistent store through which users 102 share data. The information maintained in the database(s) 112 may include, among other things, information about the users and their devices.

The backend database(s) 112 may comprise multiple separate or integrated databases, at least some of which may be distributed. The database(s) 112 may be implemented in any manner, and, when made up of more than one database, the various databases need not all be implemented in the same manner. The system is not limited by the nature or location of database(s) 112 or by the manner in which they are implemented.

Multiple devices 104 associated with the same user 102 may be communicating (via the backend 108) at the same time (for example, as shown in the drawing, some or all of the devices 104-A-1, 104-A-2 . . . 104-A-n of user 102-A may be communicating via the backend 108).

In presently preferred embodiments, devices use Web Real-Time Communications (WebRTC) during device pairing. As should be appreciated, however, while WebRTC is used during the pairing of devices, the devices may also use other protocols to communicate with each other or the backend.

The devices 104 can be any kind of computing device, including mobile devices (e.g., phones, tablets, etc.), computers (e.g., desktops, laptops, etc.), and the like. Computing devices are described in greater detail below.

Figure 2A:
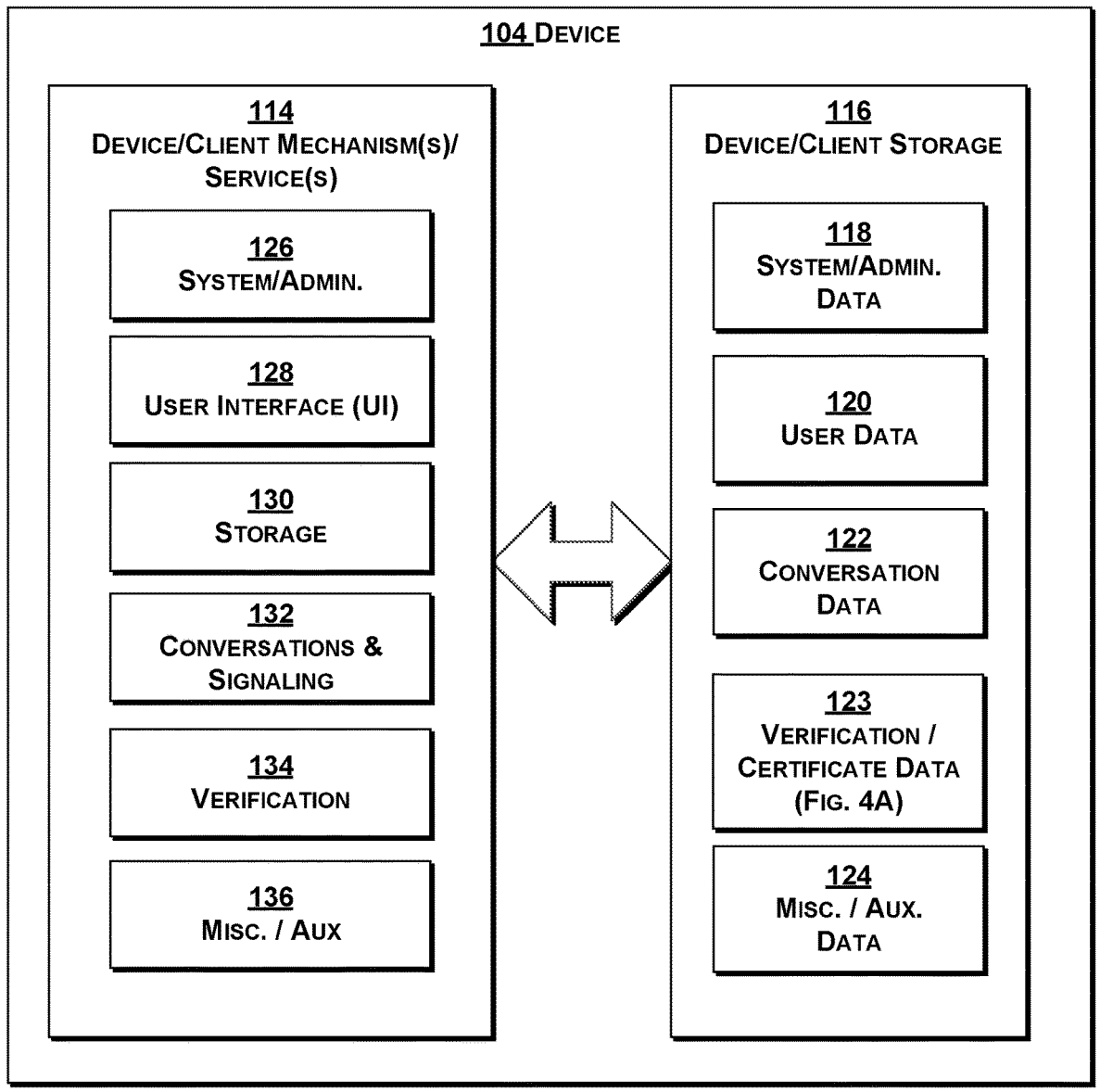
FIGS. 2A-2D depict aspects of devices according to exemplary embodiments hereof.

FIG. 2A shows exemplary aspects of a typical device 104, including device/client mechanisms 114 interacting with client storage 116. As noted, an interaction between a set of one or more users is referred to herein as a "conversation."

Device/client storage 116 may include system/administrative data 118, user data 120, conversation data 122, verification/certificate data 123 (see, e.g., FIG. 4A), and other miscellaneous/auxiliary data 124. The device/client application(s) 114 may include system/administrative mechanism(s) 126, user interface (UI) mechanism(s) 128, storage mechanism(s) 130, messaging and signaling mechanism(s) 132, verification mechanism(s) 134, and other miscellaneous mechanism(s) 136. As should be appreciated, the categorizations of data in storage 116 and of device/client mechanism(s) 114 are made for the purposes of aiding this description, and different and/or other categorizations of the data and/or device/client mechanisms may be used. It should also be appreciated any particular data and/or device/client mechanism may categorized in more than one way. Some or all of the components that make up a device may be integrated into a single physical device or appliance (e.g., a laptop computer), or they may all be separate components (e.g., a desktop computer). The connections between some or all of the components may be wireless. As another example, a device may be integrated into a television or a set-top box or the like.

Figure 2B:
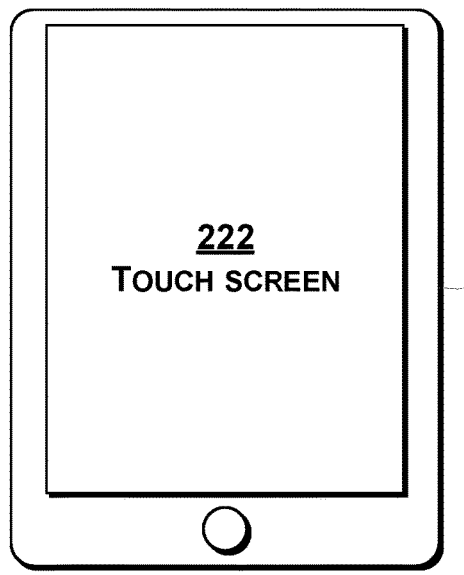
Figure 2C:
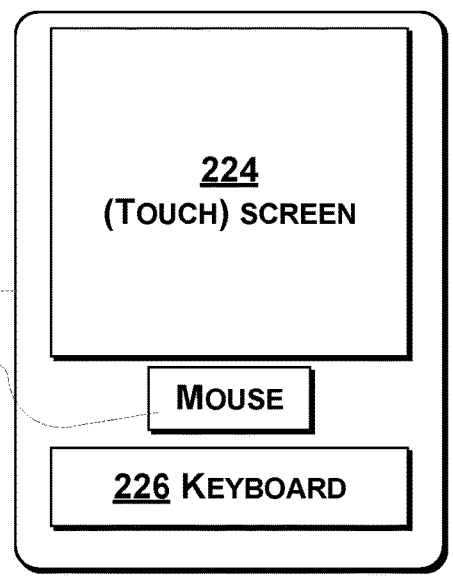
Figure 2D:
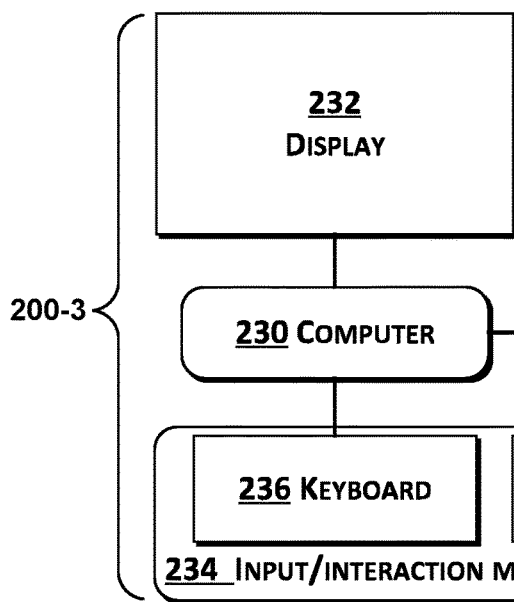

FIGS. 2B-2D show examples of devices 200-1, 200-2, and 200-3 that may be used within the system 100. These may correspond, e.g., to devices 104 used by the users 102 in FIG. 1. Device 200-1 (FIG. 2B) has an integrated display and input mechanism in the form of touch screen 222. The device 200-1 is integrated into a single component, e.g., a smartphone, a tablet computer, or the like. Device 200-2 (FIG. 2C) is also integrated into a single component, but, in addition to a screen 224, it includes a keyboard 226 and an integrated mouse 228. The keyboard may be a hardware keyboard (e.g., as in the case of a BlackBerry phone). The screen 224 may be a touch screen and the keyboard may be implemented as a software (or virtual) keyboard. Device 200-3 (FIG. 2D) comprises multiple components, including a computer 230, a computer monitor 232, and input/interaction mechanism(s) 234, such as, e.g., a keyboard 236 and/or a mouse 238. The device 200-3 may also include gesture recognition mechanism 240 and one or more sensors 242. The sensors 242 may include microphones, cameras and the like. Some or all of these components may be integrated into a single physical device or appliance (e.g., a laptop computer), or they may all be separate components (e.g., a desktop computer). Although the various components of device 200-3 are shown connected by lines in the drawing, it should be appreciated the connection between some or all of the components may be wireless. For example one or more of the sensors 242 may be wirelessly connected to the device. Some of the sensors may be incorporated into wearable devices (e.g., Google glass-type systems) possibly with voice recognition. As another example, a device may be integrated into a television or a set-top box or the like. Thus, e.g., with reference again to FIG. 2D, the display 232 may be a television monitor and the computer 310 may be integrated fully or partially into the monitor. In this example, the input/interaction mechanisms 234 (e.g., keyboard 236 and mouse 238) may be separate components connecting to the computer 230 via wired and/or wireless communication (e.g., via Bluetooth or the like). In some cases, the input/interaction mechanism(s) 234 may be fully or partially integrated into a remote control device or the like. These input/interaction mechanism(s) 234 may use virtual keyboards generated by the computer 230 on the display 232.

These exemplary devices are shown here to aid in this description, and are not intended to limit the scope of the system in any way. Other devices may be used and are contemplated herein.

Figure 3:
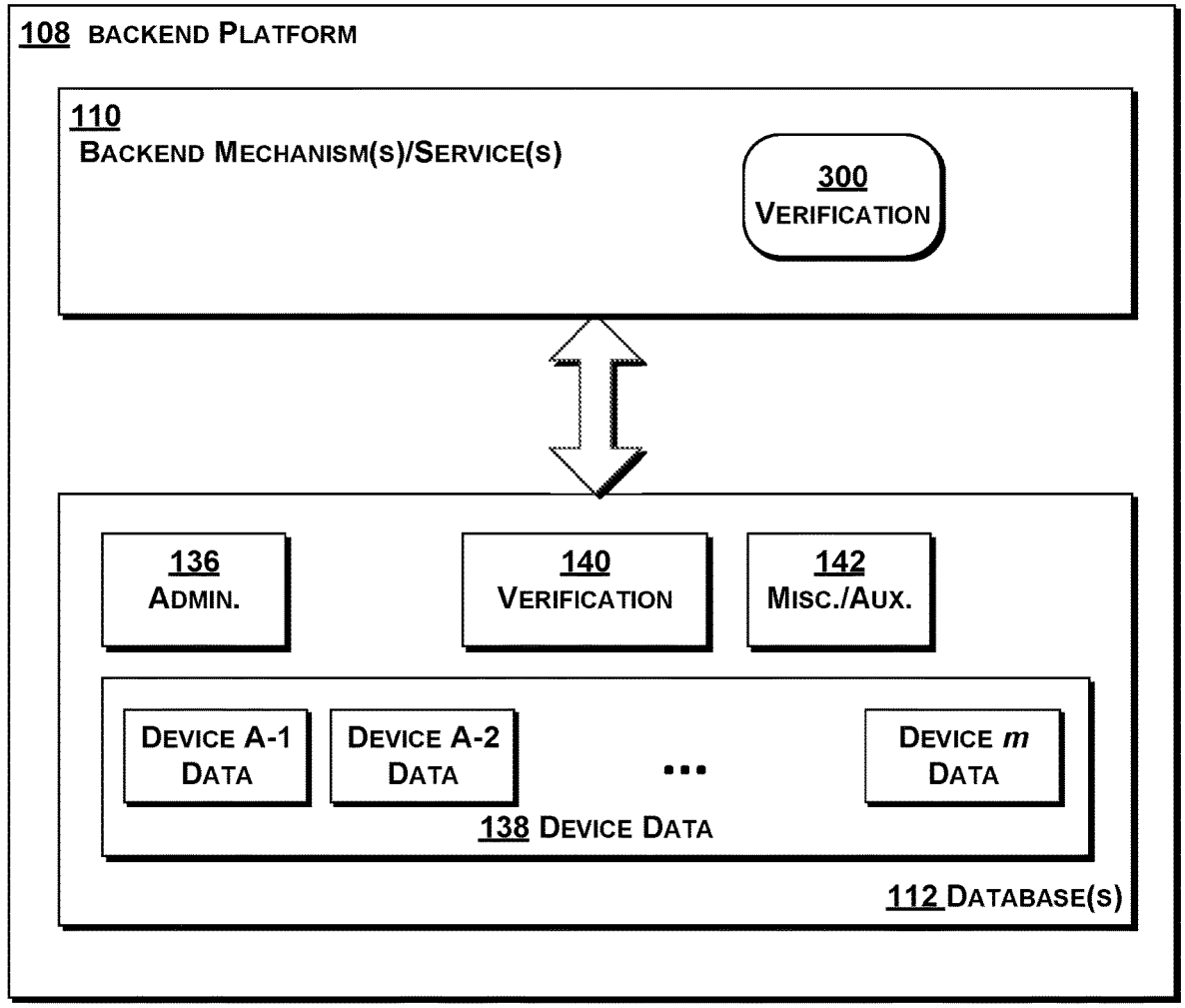
FIG. 3 depicts aspects of a backend platform according to exemplary embodiments hereof.

FIG. 3 shows aspects of an exemplary backend platform 108 in which database(s) 112 includes administrative data 136, device data 138, verification data 140, and other miscellaneous/auxiliary data 142. In preferred embodiments, each client/device 104 using or associated with the system 100 must be registered with the system. The device data 138 in the backend database(s) 110 preferably includes data about all devices in the system 100 (i.e., about devices registered with the system) and may include data about devices that were previously in the system. Thus, e.g., and with reference again to the exemplary system 100 shown in FIG. 1, the device data 138 may include data about device A-1, device A-2, . . . and device A-n, etc. The user data 140 may include data about all users 102 of the system 100. Thus, e.g., the user data 140 may include data about user A, user B, user C, . . . and user k.

The exemplary backend mechanism(s)/service(s) 110 include verification mechanism(s) 300, described in greater detail below.

As should be appreciated, the categorization of data in the backend database(s) is made for the purposes of this description, and those of ordinary skill in the art will realize and appreciate, upon reading this description, that different and/or other categorizations and/or organizations of the data may be used. It should also be appreciated that the backend database(s) 110 preferably include appropriate index data to facilitate fast and efficient access to and update of the various data stored therein.

User and Device Identity

Device Identifiers (IDs)

As noted, in preferred embodiments, each client/device 104 using or associated with the system 100 must be registered with the system. Each client/device 104 using or associated with the system 100 has a device identifier (device ID). Each device is associated with at least one user 102, and the device identifier is unique within the system 100 for a single user. Thus, within the system 100, each <user ID, device ID> pair will be unique (although there may be identical device identifiers).

Verification and Certificate Data

As mentioned above, device/client storage 116 may include verification/certificate data 123 (FIG. 2A). With reference now to FIG. 4A, the verification/certificate data 123 on a device may include one or more certificates 400. An exemplary certificate 402 includes one or more keys 404, including, preferably, at least one public key 406 and at least one corresponding private key 408. The certificates 400 may be issued, e.g., by one or more trusted certification authorities (e.g., CA(s) 119 in FIG. 1), e.g., as part of a device registration with the system 100. A device may also have one or more certificates provided during the device's manufacturing process and may use those certificates to sign certificate requests made to the backend.

In preferred implementations, a device 104 using the system 100 needs to authenticate itself with the system. This authentication may be done, e.g., using access tokens and/or passwords (as is in a presently preferred implementation) or, e.g., using client certificates. As shown, e.g., in FIG. 4A, an exemplary device 104 may have one or more client certificates 400 associated therewith. The system 100 may use or provide one or more certificate authorities (CAs) 119 (FIG. 1) for authentication and verification purposes, both during a user or device's initial use of the system, and in an ongoing manner for communication between devices 104 and/via the backend 108.

Acquiring a Client Certificate

In order to acquire a certificate, a device 104 requests a certificate from the backend 108. The request is preferably in the form of a certificate-signing request that is made of the backend 108. The certificate request may include information about the device.

Information about authenticated devices may be stored in the device data 138 in the backend database(s) 112. Device information stored in the backend database(s) 112 in device data 138. The device information may include some or all of the following:

| Attribute | Description |
| --- | --- |
| User id. | The unique identifier of the user/account to whom the device is connected. |
| Device id. | An identifier for the connected device making the request This device identifier is only guaranteed to be unique within a single user. |
| Certificate issuer | The contents of the issuer field of the certificate that should currently be used by the client. |
| Certificate serial number | The serial number of the certificate that should currently be used by the device. |

Figure 4B:
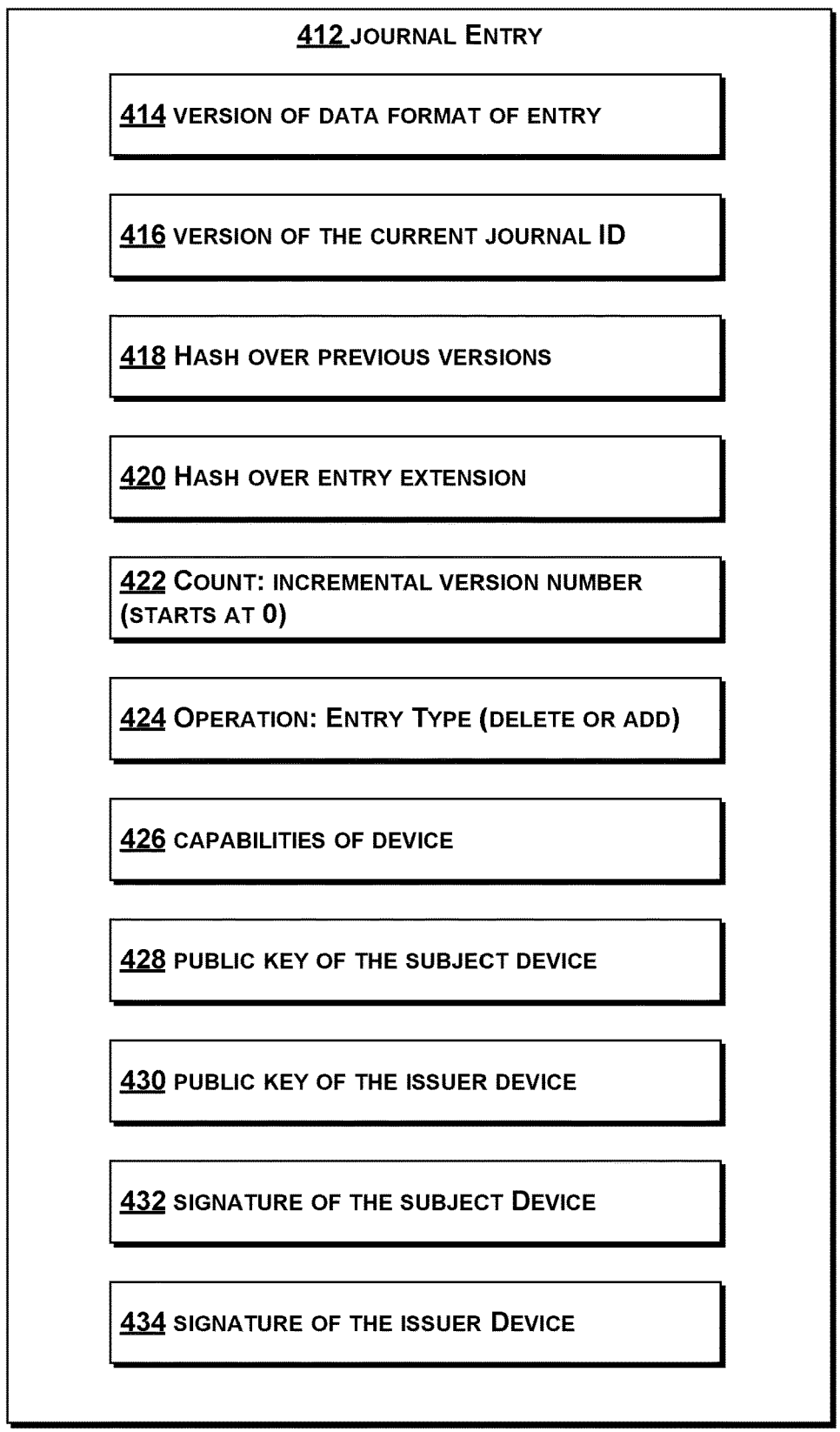

The verification/certificate data 123 may also include a journal 410, comprising a list of one or more journal entries 412. With reference to FIG. 4B, a journal entry may include the following data:

version of the data format of the entry 414
version of the current journal ID 416
history_hash 418, a hash over previous versions of the journal
extension_hash 420, a hash over the current entry extension
count 422, an incremental version number (starts at 0)
operation 424 (either delete or add)
capabilities of the device 426
a public key 428 of the subject device
a public key 430 of the issuer device
a signature 432 of the subject device
a signature 434 of the issuer device An exemplary data structure of a journal entry 412 is shown in FIG. 4C.

The manner of establishing and maintaining trust between the devices of a single user/account (i.e., of establishing and maintaining a journal for a particular user/account) is described below, as is the manner of establishing and maintaining trust between the devices of a different users/accounts.

Establishing and Maintaining Trust Between Devices of a Single User/Account

If a user has only one device, that device is added to the user's journal. If a user has more than one device, the devices are paired through Device Pairing as explained below.

Device Pairing Overview

Discovery

Discovery happens between an existing provisioned device and a new device is to be added to the user's account.

Various approaches may be used to initially exchange data between the two devices. For example, various sensor-based mechanisms may be used (e.g., the Bonjour protocol, Bluetooth, QR codes, ultrasound audio data transfer, etc.). Since both devices may not support a common sensor, a mechanism that does not rely on sensors may be used.

A backend component (e.g., part of verification mechanism(s) 300) may facilitate the exchange of messages.

Authentication of WebRTC

Short Authentication String (SAS) allows devices to authenticate WebRTC calls without relying on the security of a signaling channel.

WebRTC calls may use a data channel that is established inside the encrypted SRTP channel and is multiplexed with other streams.

A simple coin-flipping protocol/commitment scheme (as described below) may be run over the data channel to verify the self-signed DTLS certificates. Alternatively, if the call is established between two clients that are already fully provisioned and could therefore use KASE (Key Agreement Signaling Extension) to replace DTLS the system verifies the devices' identity keys and the distribution tag. KASE allows skipping of the DTLS negotiation phase of WebRTC calls by including the necessary parameters in the SDP. This allows both sides to securely calculate a shared secret once the SDPs have been exchanged. If the channel over which the SDPs are exchanged is authenticated and encrypted, only the public values needed for a DH agreement are required in the SDP.

Commitment Scheme/Coin Flipping Protocol

A coin flipping protocol allows two parties (Alice and Bob) to agree on a random value of arbitrary entropy, in a way that neither party can dictate the outcome of the random value. Once the protocol has finished, both parties should have the same secret value. Comparing the values from both sides allows detection of man-in-the-middle (MitM) attacks.

In the commit phase, Alice generates a large random number A and sends the hash H(A) to Bob.

In the reveal phase, Bob sends his large random number B to Alice, who replies by sending A to Bob.

Bob can then verify Alice's commitment by computing H(A) and comparing it to the value received from Alice.

Both sides can now compute a shared secret S based on A and B:

$$S=H(A\char`\^B\|P_1 \ldots P_n).$$

Where $P_1 \ldots P_n$ are optional parameters that Alice and Bob want to include as a binding in the shared secret. These can, e.g., be the fingerprint of certificates or keys Alice and Bob use for end-to-end encryption.

The two parties can compare the value of S to ensure that no man-in-the-middle attack took place. S can be truncated to a shorter value (with an entropy comparable to a PIN) to make human verification easier. This shorter or truncated value (effectively a truncated hash) is commonly referred to as a Short Authentication String (SAS).

The coin flipping protocol can be used inside a WebRTC data channel to verify the DTLS public key fingerprints (used as the additional parameters $P_x$). This allows to effectively authenticate a WebRTC channel for both media and other data.

Once the coin-flipping protocol has completed, both sides (devices) can display a Short Authentication String.

In some exemplary embodiments hereof, the entropy of the SAS may be 32 bits. Those of ordinary skill in the art will appreciate and understand, upon reading this description, that different numbers of bits may be used for the SAS (e.g., the industry average is between 16-20 bits). The chances of a successful man-in-the-middle attack are about 1 in 4 billion with a SAS entropy of 32 bits. Users can optionally display the full hash further decrease the chances of an attack. If the SAS is equal on both sides, the risk of a man-in-the-middle attack is effectively mitigated.

Signaling

In terms of signaling, all that is needed to establish a WebRTC channel is an SDP (Session Description Protocol) exchange. Both devices send each other their SDP, the existing (already provisioned) device sends the SDP offer first (also containing the TURN server credentials, which the new un-provisioned device does not yet have), and the new device replies with an SDP answer.

WebRTC Data Channel

Once the signaling phase is complete, both devices perform a standardized ICE (Interactive Connectivity Establishment) exchange and can then setup a DTLS-SRTP channel. The channel does not contain any media stream, only a data channel.

Verification

Once the data channel is set up, a coin-flipping protocol (described below) may be run over the data channel before any other data are exchanged. Short Authentication String (SAS) values may be displayed on both screens and the user can verify they are the same before continuing and sending potentially sensitive data from the existing device to the new one.

This step ensures that the data channel between both devices is encrypted and authenticated.

Morphing Identity

Establishing and Maintaining Trust Between the Devices of a Different Users/Accounts Introduction The morphing identity approach, according to exemplary embodiments hereof, enables devices of the same account to trust each other and devices of another account to trust the same devices. The aim of this approach is to limit the number of verifications required to establish a full trust relationship between all devices of two users/accounts.

An implementation or embodiment of the morphing identity approach should fulfill all formal requirements (listed below).

An Exemplary Data Structure

In presently preferred exemplary embodiments hereof, the data structure used to represent the trust relationship is referred to herein as a journal (described above with reference to FIGS. 4B-4C). As noted above, a journal has a list of journal entries, with each journal entry structured in the following way (as shown in FIG. 4C):

Initially a trust relationship is established between two devices of the same user during a device pairing process. That trust relationship is documented as a journal entry (see above).

The journal entry then becomes part of a list that is immutable (and therefore tamper-proof) due to integrity checks that chain elements of the list. A journal entry may be considered as a "certificate" that is cross-signed by both devices. As should be appreciated, cross-signing is only performed when a device is added. When a device is removed, only one signature is required.

A subsequent verifier may iterate over the elements of the list in the journal and determine what devices were added and removed, and thereby conclude what devices are still trusted. This approach applies to devices of the same user/account and to devices of any other user/account. In other words, a user adding a device to their account may verify it with another device associated with their account and, using the journal associated with that account, determine what devices associated with that account are trusted. And a second user need only "verify" with one device of a first user in order to determine which devices of the first user are trusted.

Morphing Identity—Components

Backend

An exemplary implementation of the backend 108 provides journal endpoints for the following:

fetch one or many journal entries for a given journal ID add an entry to a journal remove all devices from an account and adds one new device The journal endpoints may be provided, e.g., via the verification mechanism(s) 300, FIG. 3.

Those of ordinary skill in the art will appreciate and understand, upon reading this description, that different and/or other endpoints may also be provided.

Example journal endpoints may include:

| Endpoint | Description |
| --- | --- |
| /journal/get | Fetches one or many journal entries for a given journal ID. <br> Parameters <br> lid  type: UUID   Description: Journal ID <br> Response <br> 200 OK <br> [entries]  type: array  Description: Array of entries (CBOR) <br> 460 The journal ID was not found <br> No parameters. |

```
pub struct JournalEntry {
    pub format_version: u32,         // version of the data format of an entry pub
    journal_id: u32,                 // version of the current journal ID
    pub history_hash: Digest,        // hash over previous versions
    pub extension_hash: Digest,      // hash over the entry extension
    pub count: u32,                  // incremental version number, starts at 0
    pub operation: EntryType,        // delete = 0, add = 1
    pub capabilities: u32,           // capabilities of a device
    pub subject_publickey: PublicKey, // public key of the subject device
    pub issuer_publickey: PublicKey,  // public key of the issuer device
    pub subject_signature: Signature, // signature of the subject
    pub issuer_signature: Signature,  // signature of the issuer
}
```

| Endpoint | Description |
| --- | --- |
| /journal/set | Adds an entry to a journal<br>Parameters<br>  lid         type: UUID      Description: Journal ID<br>  Entry      type: CBOR     Description: Journal entry (CBOR)<br>Response<br>200 OK Description: The new journal entry is accepted and was added to the journal.<br>[entries]   type: array   Description: Array of entries (CBOR)<br>460 the journal ID was not found.<br>No parameters.<br>461 Journal entries are missing.<br>latest type: number Description: Latest version of the journal entries<br>462 The journal entry is not valid.<br>No parameters. |

| Endpoint | Description |
| --- | --- |
| /journal/reset | Removes all devices from an account and adds one new device<br>Parameters<br>  lid         type: UUID      Description: Journal ID<br>  Entry      type: CBOR     Description: Journal entry (CBOR)<br>Response<br>200 OK Description: The new journal root entry was accepted.<br>[entries]   type: array   Description: Array of entries (CBOR)<br>460 The journal ID was not found.<br>No parameters. |

These or other endpoints may be implemented, at least in part, by the verification mechanism(s) 300 (FIG. 3), and the journal data for user's may be stored in the backend database(s) 112, e.g., a verification data 140.

Clients

Adding a Device

Adding a device can only be done through pairing with a device already associated with the system. The device to be added is referred to here as the "new" device 104-N, and the device already associated with the system is referred to as the "existing" device 104-O.

Before a channel between the existing device 104-O and the new device is established, the existing device 104-O queries the backend 108 to determine whether the existing device has the latest journal entry. If the existing device 104-O does not have the latest journal entry, the latest entries are obtained (e.g., downloaded from the backend 108).

Once the channel between the two devices (104-O, 104-N) is established and secured, the existing device 104-O sends the complete journal to the new device 104-N, as well as an incomplete new journal entry.

The new (incomplete) journal entry contains all fields, except for the subject public key, the subject signature, and the issuer signature.

The new device 104-N receives the journal from the existing device 104-O, validates it and aborts if the journal is invalid.

The new device 104-N then checks if the issuer public key of the new entry is in the trusted device list and aborts if not. The new device 104-N verifies the other fields with sanity checks and adds the subject signature.

The new entry is then sent back from the new device 104-N to the existing device 104-O. The existing device 104-O verifies the subject signature and aborts if it cannot.

The existing device 104-O then sends the new journal entry to the backend 108. The backend 108 checks the new entry against the journal and sends back one of the return codes described above (200—OK; 460—The journal entry does not match with journal or the journal ID was not found; or 461: Journal entries are missing; or 462 the journal ID is not valid).

Figure 5:
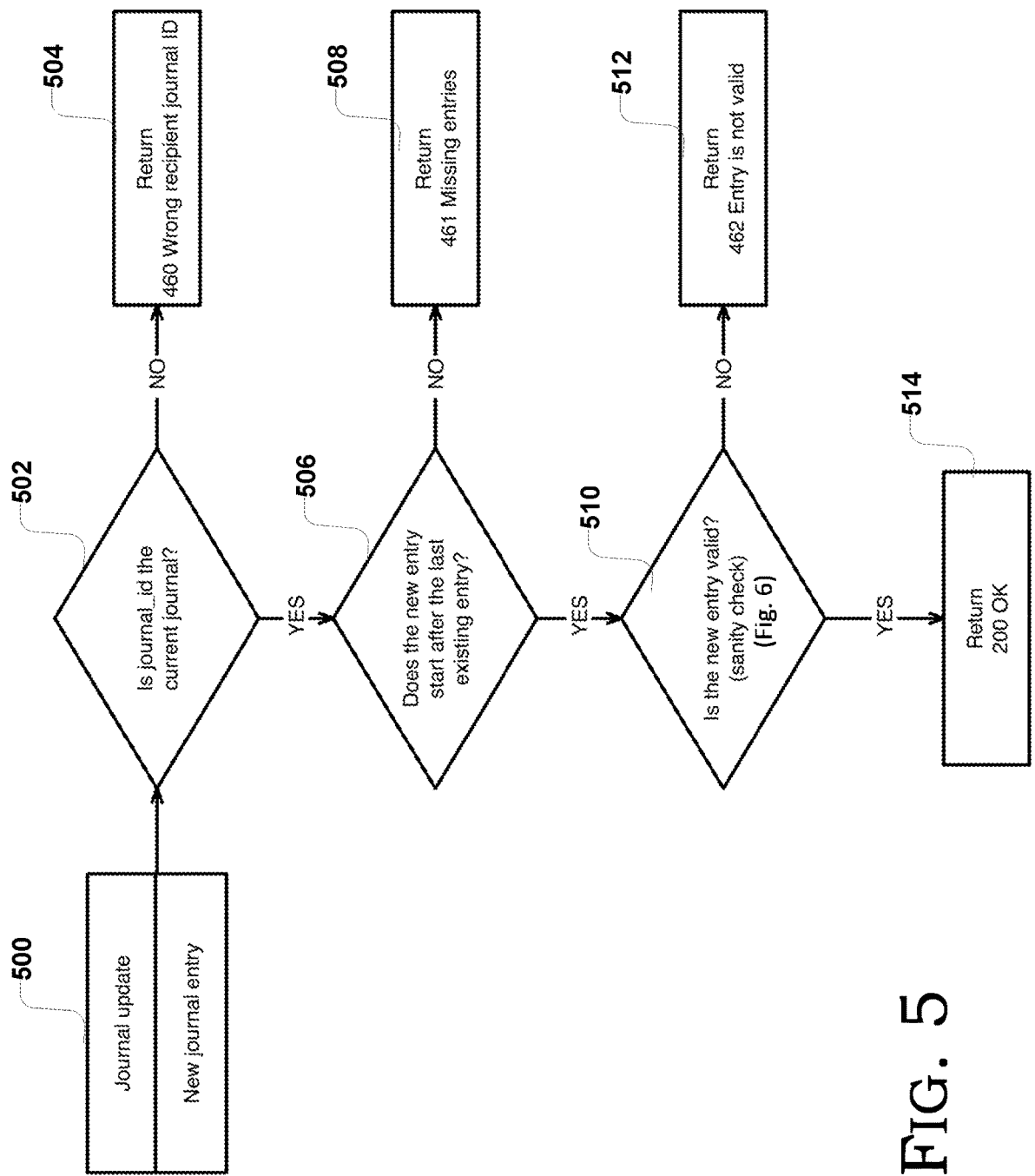
FIGS. 5-10 are flowcharts of processing according to exemplary embodiments hereof.

With reference to the flowchart in FIG. 5, showing exemplary operations of the verification mechanism(s) 300 in the backend 108 receives a new journal entry 500 and the backend checks (at 502) if the journal ID is the current journal. If the journal ID is not the current journal, then (at 504) the backend returns a code (460) to the existing device 104-O indicating that the journal entry does not match with journal, or the journal ID was not found. This error should not occur under normal conditions and it indicates the client has a broken journal, or that the journal was replaced on the backend. If the existing device 104-O receives a code 460 from the backend, it sends an abort message to the new device 104-N and aborts the device pairing.

If the journal ID is the current journal (as determined at 502), then the backend 108 determines (at 504) if any journal entries are missing. To do this, the backend may check if the new journal entry starts after the last existing journal entry. If journal entries are missing (as determined at 506), then the backend returns (at 508) a code (461) to the existing device 104-O indicating that journal entries are missing. The backend also sends back to the existing device 104-O the latest entry count to the existing client. The existing device 104-O can then fetch the missing entries and start over by sending the new amended journal to the new device 104-N.

Figure 6:
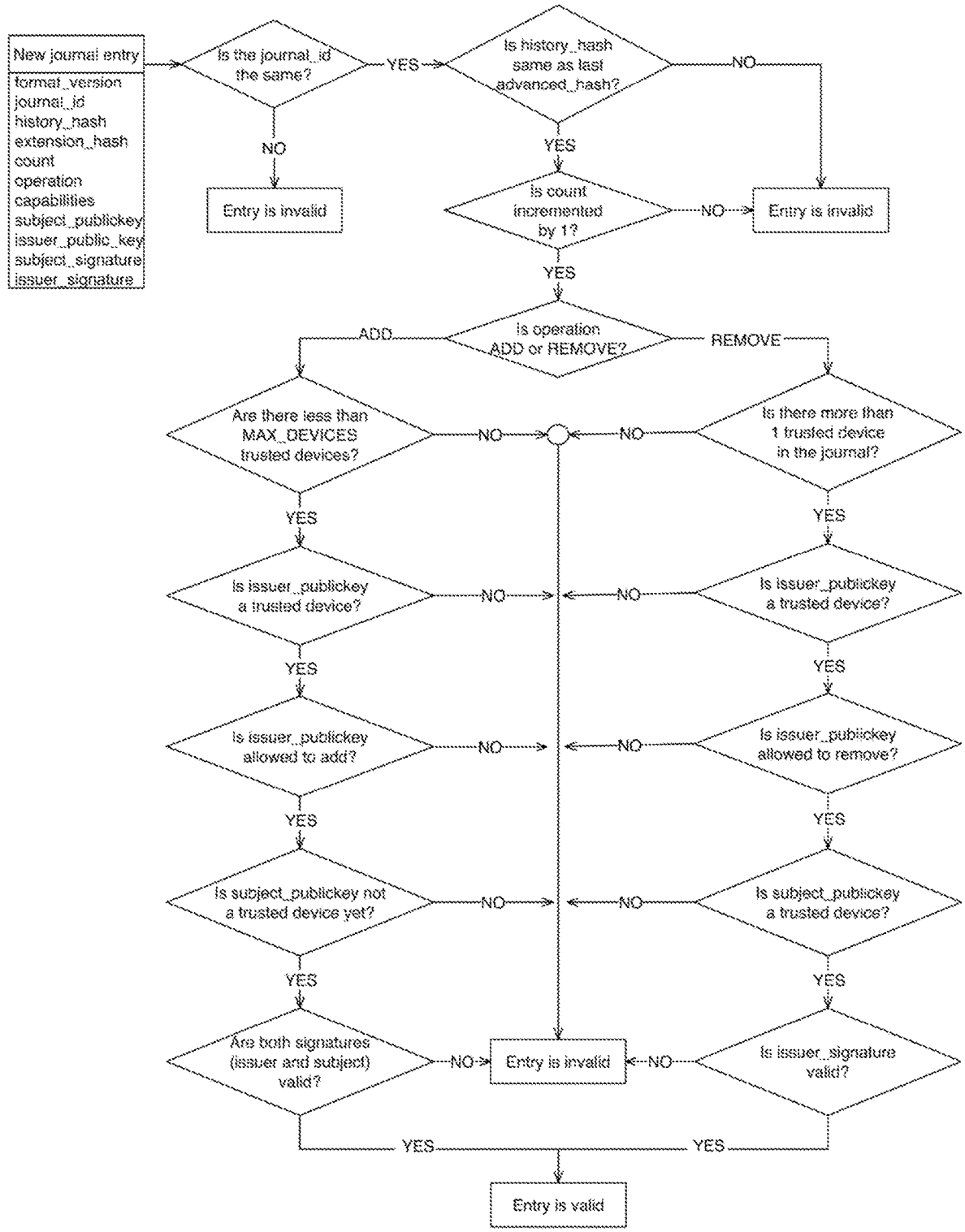

If journal entries are not missing (as determined at 506), then the backend 108 checks if the new journal entry is valid by performing a sanity check (at 510) to determine if the new journal entry is valid (e.g., as shown in the flowchart in FIG. 6). If it is determined (at 510) that the new journal entry is not valid, then the backend returns (at 512) a code (462) to the existing device 104-O indicating that the new journal entry is not valid. This code (that journal entry is not valid) indicates that the journal entry did not pass the sanity check. This error should not occur under normal conditions and it indicates the client/device has a broken journal, or that the journal was replaced on the backend. The existing device 104-O sends an abort message to the new device 104-N and aborts the device pairing.

On the other hand, if it is determined (at 510) that the new journal entry is valid, then (at 514) the backend 108 returns a code (200) to the existing device 104-O. The code 200 indicates that the new journal entry is accepted and was added to the journal. The existing device 104-O can send a success message to the new device 104-N and proceed to further data exchange between the two devices (104-O, 104-N). The new device 104-N will wait for further data from the existing device 104-O.

Distribution Tag

A distribution tag is used to force the distribution of new journal entries over an unreliable or malicious infrastructure. To this end, a tag is added to the message envelope of end-to-end encrypted messages. The tag should not be modifiable by the backend, which is achieved by including in the tag in the HMACed section of the message envelope. In presently preferred exemplary embodiments, Proteus is used for end-to-end encryption, but those of ordinary skill in the art will realize and appreciate, upon reading this description, that the security guarantee of message integrity (the guarantee that messages cannot be modified during transport between two devices) is sufficient to guarantee the integrity of the Distribution Tag.

The tag preferably contains the following fields:
Journal ID: Refers to the journal currently used
Latest version: version number (count) of the latest entry
History hash: advanced hash of the latest entry
CBOR/CDDL Format

```
Envelope = {
    0: uint,        ;; Version
    1: Mac,         ;; Mac over all following fields
    2: bstr         ;; Message as embedded CBOR.
    3: uint,        ;; journal ID
    4: uint,        ;; Version number of the latest entry
    5: Hash         ;; Advanced hash of the latest entry
}
```

Removing a Device

Removing a device can only be initiated from a device tied to the same account. A new journal entry is created for that purpose and the subject signature field is the same as the issuer signature field. The client sends the new entry to the backend 108 (i.e., to the backend endpoint). The backend 108 checks the new entry against the journal and sends back a code, e.g., one of the return codes described here.

| Code returned | Description |
|---|---|
| 200 | The new journal entry is accepted and was added to the journal. The existing client can send a success message to the new client and proceed to further data exchange between the two clients. The new client will wait for further data from the existing client. |
| 460 | The journal entry does not match with the journal, or the journal ID was not found. This error should not occur under normal conditions and indicates the client has a broken journal, or that the journal was replaced on the back end. The existing client sends an abort message to the new client and aborts the device pairing. |
| 461 | Journal entries are missing. The BE sends back the latest entry count to the existing client. The existing client can then fetch the missing entries and start over by sending the new amended journal to the new device. |
| 462 | The journal entry is not valid. The journal entry did not pass the sanity check. This error should not occur under normal conditions. It indicates the client has a broken journal, or that the journal was replaced on the BE. The existing client sends an abort message to the new client and aborts the device pairing. |

As should be appreciated, these and other return codes used in this description are merely exemplary, and those of ordinary skill in the art will appreciate and understand, upon reading this description, that different and/or other codes or code values may be used.

Removing All Devices

Removing all devices means that the current journal is dropped and a new one is created instead. This operation should only be carried out when no existing client is available to the user. The client creates a new cryptobox identity and creates journal containing only the root entry. It then sends the new journal to the backend 108.

The backend 108 does not delete the existing journal, in case it still needs to be queried when existing messages from the message queue are processed on other clients. However the new journal will be marked as the currently active one.

The backend 108 sends back a code 200 OK.

Receiving a Message

When a message is received the journal information is extracted from the message envelope (distribution tag).

The metadata from the Distribution Tag along with the existing metadata is checked according to the decision tree in either "Receiving messages from someone else" or "Receiving messages from own devices" (below).

Messages can stay in the backend queue for a long time and the journal ID from the sender might change after a message was sent. It is therefore important to take the journal ID from the corresponding Distribution Tag in the message envelope as a reference when evaluating if the message was sent from a trusted sender.

Conversely a message could have been sent from a device that was removed while the message was in the message queue. The message is still valid. But it is therefore equally important to use the count number of the corresponding Distribution Tag from the message envelope as the reference and check if the sending device was trusted at that point in time. If messages are sent in order this should normally not be a problem, but since this is not a guaranteed property of the system, corner cases need to be catered for.

Receiving Messages from Own Devices

Figure 7:
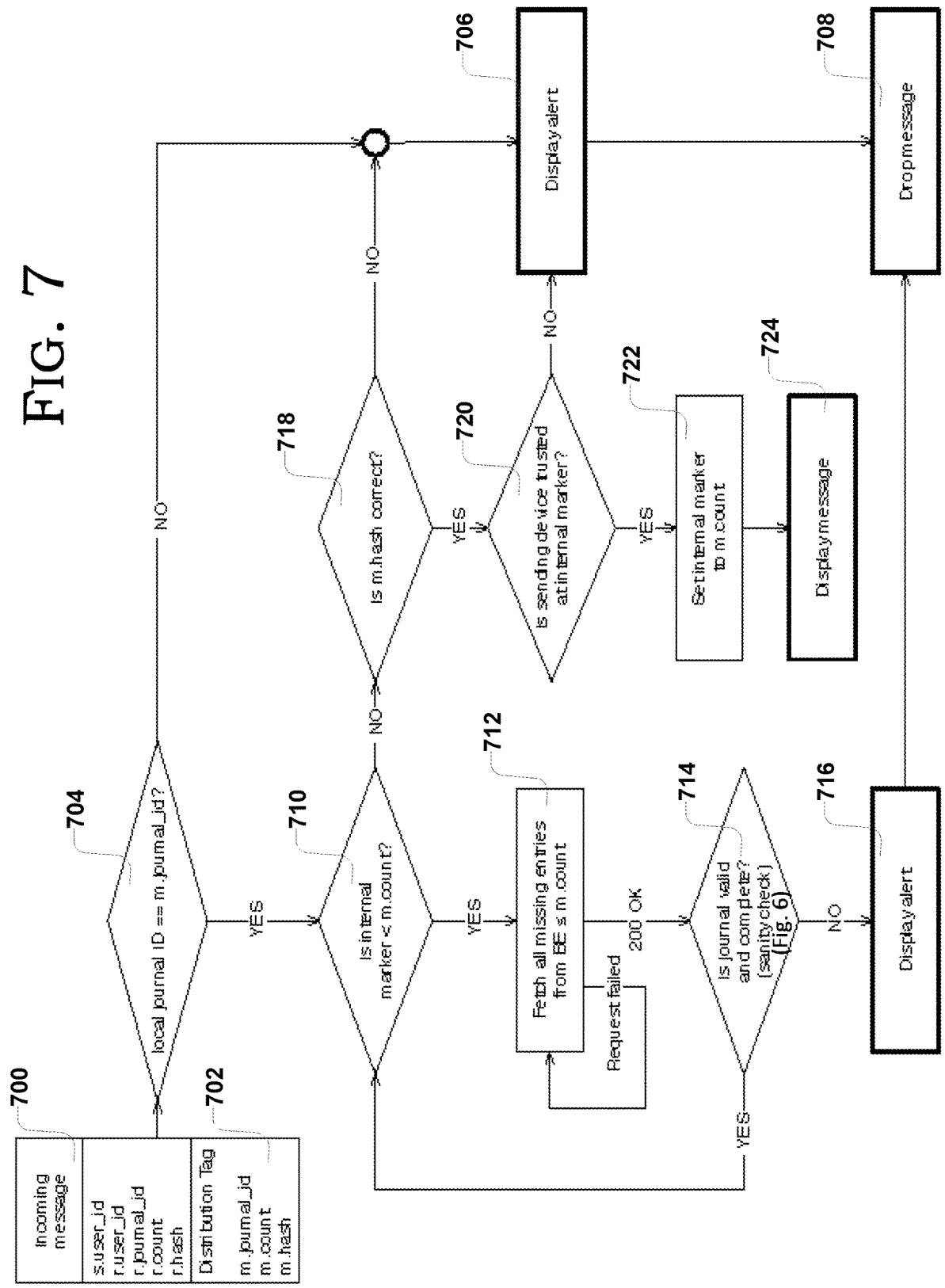

An exemplary procedure for receiving messages from one's own devices is explained in more detail in the exemplary flowchart in FIG. 7.

With reference to the flowchart in FIG. 7, a device 104 receives an incoming message 700, including a distribution tag 702. The incoming message includes the following:
The sender's user ID (s.user_id)
The recipient's user ID (r.user_id)

The recipient journal ID (r.journal_id)
The recipient count of latest entry (r.count)
The recipient hash (r.hash)
The distribution tag 702 contains the following fields:
Journal ID: the journal currently used
Latest version: version number (count) of the latest entry
History hash: advanced hash of the latest entry (where advanced_hash is the hash of the latest entry)

The device 104 checks (at 704) if the local journal ID is the same as the journal ID of the journal being used (local journal ID=m.journal_id). If the journal IDs do not match (at 704), then an alert is displayed (at 706), and the incoming message is dropped (at 708). On the other hand, if the journal IDs do match (at 704), then the device checks (at 710) whether the internal marker is less than the version number (count) of the latest entry (marker<m.count). If it is determined (at 710) that marker <m.count, then the device fetches the missing journal entries from the backend (at 712) and checks the journal for validity and completeness (at 714) (using, e.g., the validity checking shown in the flowchart in FIG. 6). If the journal is not valid (as determined at 714), then an alert is displayed (at 716), and the incoming message is dropped (at 708). If the journal is valid (as determined at 714), then the device again checks (at 710) whether the internal marker is less than the version number (count) of the latest entry (marker <m.count).

If it is determined (at 710) that the internal marker is not less than the version number (count) of the latest entry, then (at 718), the device checks if the advanced hash of the latest entry is correct. If the hash of the latest entry is not correct (as determined at 718), then an alert is displayed (at 706), and the incoming message is dropped (at 708). Otherwise, if the hash is correct (at 718), then the device checks (at 720) if the sending device is trusted. If the sending device is not determined to be trusted (at 720), then an alert is displayed (at 706), and the incoming message is dropped (at 708). Otherwise, if the sending device is determined to be trusted (at 720), then the internal marker is set to the version number (count) of the latest entry (at 722) and the message is displayed (at 724).

Receiving Messages from Someone Else

Figure 8:
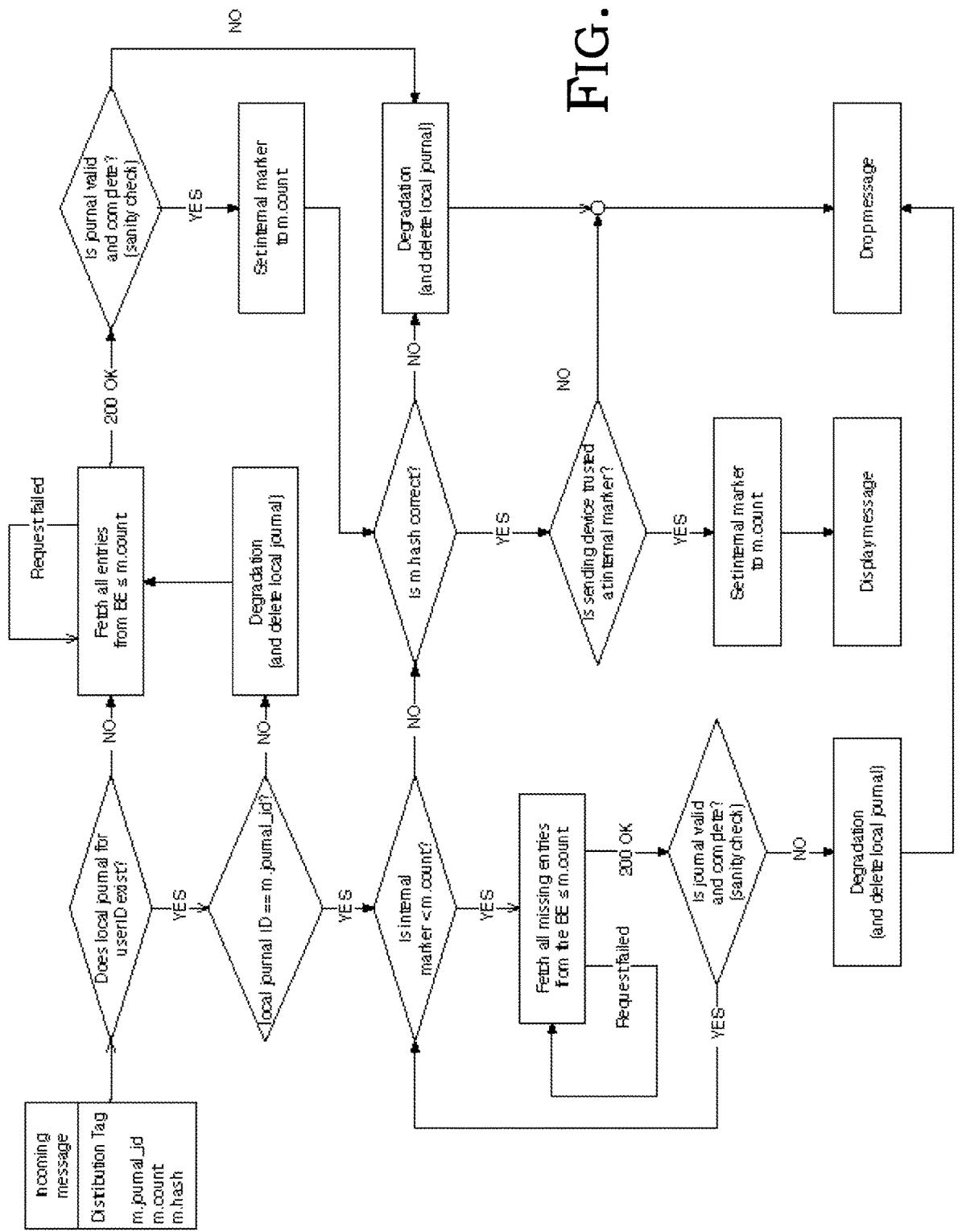

An exemplary procedure for receiving messages from someone else's devices is explained in more detail in the flowchart in FIG. 8.

Sending a Message

When sending a message the receiving devices are gathered from the local journal for the receiving accounts. If no local journal is found the backend 108 is queried first.

When a message is sent, a client can discover new entries in both its own journal and/or the journal of the recipient and needs to react to those. Likewise, it can also detect if the journal ID of the recipient has changed.

Figure 9:
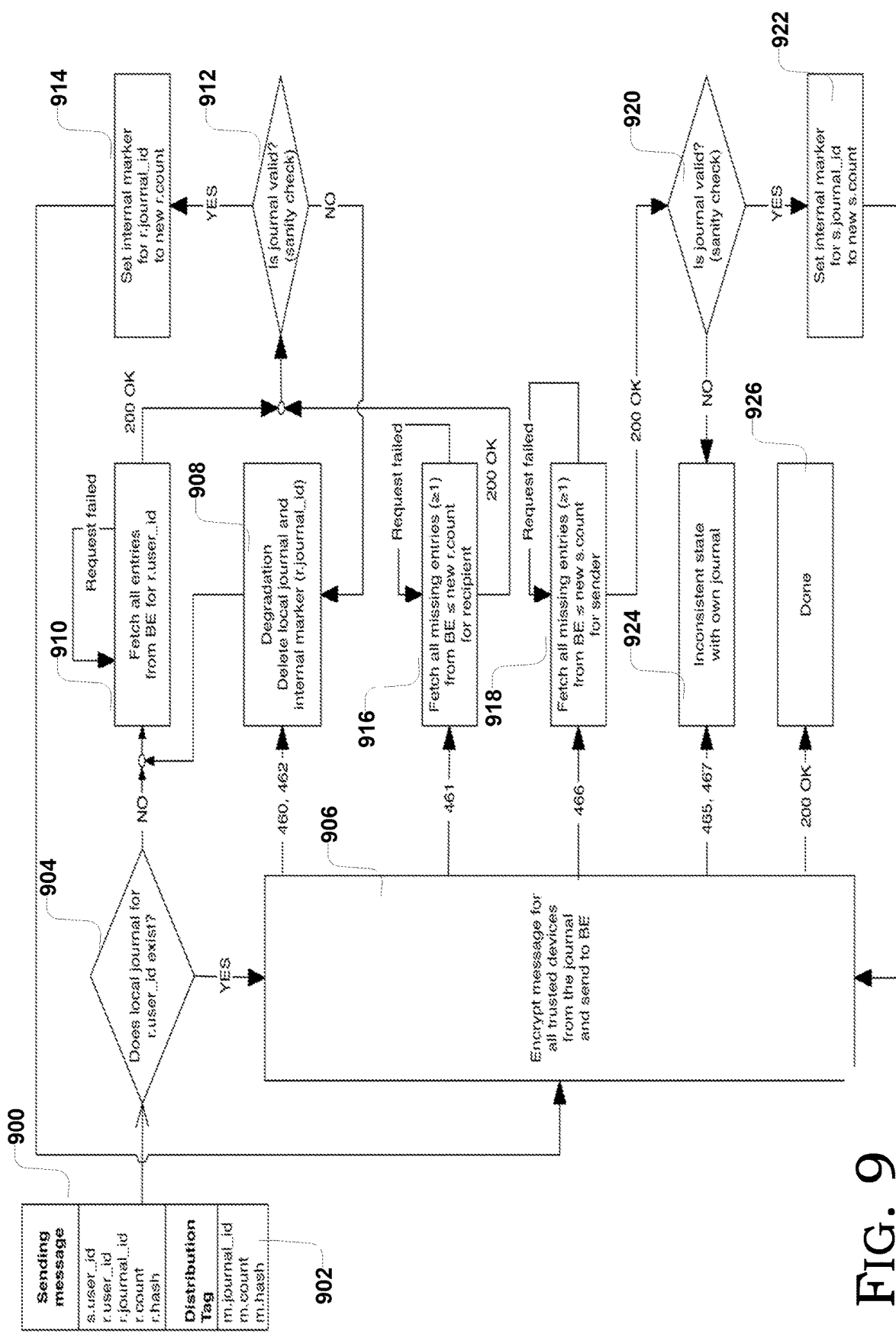

An exemplary procedure for sending messages is depicted in more detail in the flowchart in FIG. 9, in which a message 900 is being sent with a distribution tag 902. The message 900 includes sender and recipient IDs (s.user_id and r.user_id), the recipient's journal id (r.journal_id), and the recipient's count and hash (r.count, r.hash). The distribution tag includes m.journal_id; m.count, and m.hash.

Figure 10:
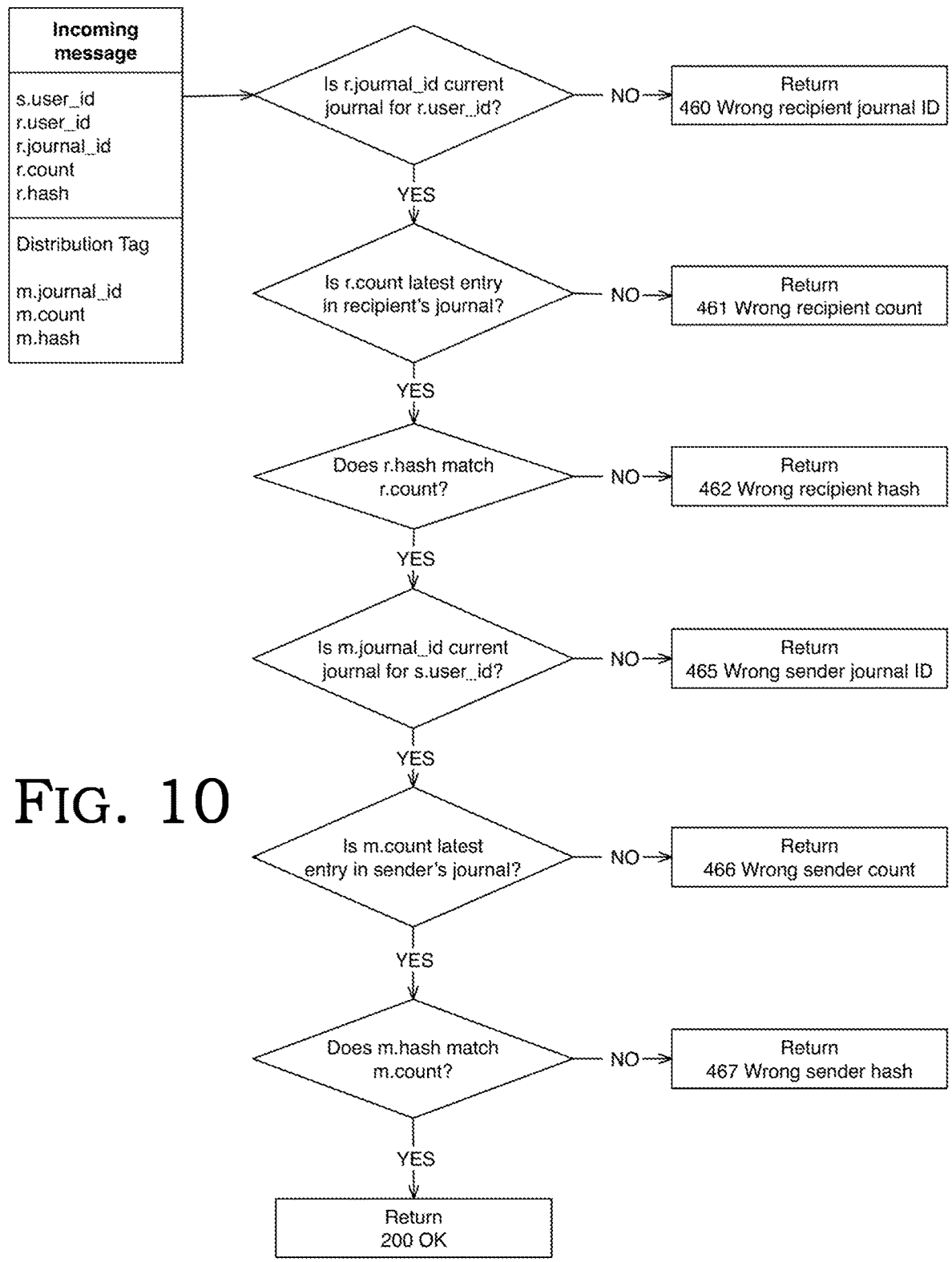

First, the sending device checks (at 904), whether a local journal exists (on the device) for the recipient. If it is determined (at 904) that a local journal exists (on the device) for the recipient, then messages for all trusted devices from the recipient's journal are encrypted and sent to the backend (at 906). The backend's processing of incoming messages shown in the flowchart in FIG. 10. The backend 108 receives the message and distribution tag from the sending device, and performs various checks (shown in FIG. 10). The following table summarizes various possible codes returned by the backend:

| Code | Description |
| --- | --- |
| 460 | Wrong recipient journal |
| 461 | Wrong recipient count |
| 462 | Wrong recipient hash |
| 465 | Wrong sender journal ID |
| 466 | Wrong sender count |
| 467 | Wrong sender hash |
| 200 | OK |

As should be appreciated, these return codes are merely exemplary, and those of ordinary skill in the art will appreciate and understand, upon reading this description, that different and/or other codes or code values may be used.

Processing at the client 104 continues based on the code returned by the backend.

If the return code from the backend is 460 or 462, indicating a wrong description journal or a wrong recipient hash, then (at 908) the client proceeds (at 910) fetch all entries for the recipient's journal. If the client succeeds in getting the recipient's journal (at 910), and the journal is determined to be valid (at 912, using, e.g., the processing shown in FIG. 6), then the internal marker for the recipient's journal is set to the new count value (at 914). Processing then again continues (at 906), with messages for all trusted devices from the recipient's journal being encrypted and sent to the backend.

If the return code from the backend is 461 (signifying "Wrong recipient count"), then missing entries from the recipient's journal are obtained from the backend (at 916), and processing continues with a validity check at 912, then at 914, and then at 906.

If the return code from the backend is 466 (signifying "Wrong sender count"), then missing entries from the sender's journal are obtained from the backend (at 918), and then the sender's journal is checked for validity (at 920). If the sender's journal passes the validity checks (at 920), the internal marker for the sender's journal is updated to the new count value (at 922) and processing again continues at 906.

If the backend returns codes 465 or 467 (indicative of a wrong sender journal ID or a wrong sender hash), or if the validity check (at 920) fails, then the device is considered to be in an inconsistent state (at 924).

If the backend returns a code 200 (OK), then processing is done (at 926).

Marking an Account as Verified

There are two places where an account can be marked as verified:
  In a user profile
  In the calling interface When the state is changed from unverified to verified, the current journal of that account is "pinned" and, preferably, a visual indication (e.g., a blue shield) starts appearing for that user.

This means that a 1:1 conversation will henceforth show the blue shield and group conversations will show the shield when all participants have been verified.

A degradation of the verification status happens when the client learns that the other user started to use a new journal, either when receiving new messages or trying to send new ones. When a degradation occurs, the behavior is similar to the previous system: the toggle is switched back to "unverified", the blue shield disappears, a system message is shown in the relevant conversations and a warning is displayed when sending a message for the first time after a degradation.

When the state is manually changed from verified to unverified the same steps are triggered.

Syncing the Verified Status Across Own Devices

For convenience the manual change of the verification status can be synced across the devices of the same account. While this change of status is considered sensitive data, we can use the fact that sessions between devices of the same account are now always authenticated.

It is therefore enough to use an end-to-end encrypted message to encrypt the status change and send it to all other devices of the same account. In presently preferred exemplary embodiments, Proteus is used for end-to-end encryption, but those of ordinary skill in the art will realize and appreciate, upon reading this description, that the security guarantee of message confidentiality (the guarantee that messages cannot be decrypted and read during transport between two devices) is sufficient to guarantee the confidentiality of the status change.

It is important that the message contains the Distribution Tag that was valid when an account was marked as trusted, otherwise it is unclear what exactly is being trusted.

Immutability

New elements need to be signed by a device that was previously added to the trusted devices list. Therefore only trusted devices can add or remove devices.

Since cross-signing essentially proves that the private identity key of a new device was used, cross-signing ensures that new devices cannot be added "against their will."

The signatures apply to all fields above the two signature fields. This means that both devices (and ultimately the user(s)) know exactly what kind of operation they agree to.

Every journal entry stores the hash over the previous journal entry of the journal. In the example journal data structure described above (and shown in FIG. 4B), this hash is stored a field called history_hash. Since this history hash field is also signed, it links the journal entries to one another and prevents the insertion of previous journal entries at a later time for a journal that is already distributed.

Verification

The current state of a journal can be uniquely identified by the tuple <journal_id, count, advanced_hash>, where journal_id is the ID of the journal (416 in FIG. 4B), count is the incremental index of the latest entry (422 in FIG. 4B), and advanced_hash is the hash of the latest entry (420 in FIG. 4B). The current journal state may be used in a distribution tag (discussed below) to convey what the latest version of the journal is without sending the journal itself.

Verifying that two users see the same two tuples on each side is sufficient to ensure that both users know exactly what devices to trust when a message is received and what devices to use as recipients when encrypting messages.

This also implies that the communication was verified in the past for the duration of the lifetime of the journals as long as malicious devices were not added because of private key theft (which would have been noticeable to the affected party).

To simplify verification of the tuples, they can be included as an additional parameter in a coin-flip protocol used over WebRTC data channels.

The Long-Term Fingerprint

As an alternative to a trust-on-first-use approach, users may publish their long-term fingerprint through third party channels. The long-term fingerprint can be compared before communication between users is initiated.

The long-term fingerprint may be, e.g., a hash of the root entry of the current journal. While the long-term fingerprint does not provide the same guarantee as a comparison of a distribution tag (since it contains no information about the current state of the journal), it still provides a guarantee that the communication is initiated with the right journal (and therefore account) as long as no private keys of that journal were compromised. In that respect the long-term key is comparable to the PGP public key fingerprint.

Rotation of Identity Key Material

The morphing identity approach introduces a fundamental change: identity key material no longer has to be long-term. In fact, users can choose at any time to dismiss an identity key, or to replace it by another one without having to go through re-verifying with all of their contacts.

This helps in situations where devices have been lost and there is no possibility to remotely wipe their content. Identity keys can effectively be revoked, minimizing the risk that keys from the lost device will become a threat in the future.

Changing key material as often as possible is a desirable property, and has become a standard practice for encryption keys with the off-the-record protocol (or other protocols with forward secrecy). It is known as forward secrecy, and minimizes the risk that the same keys are used over a long period of time and therefore become more prone to leakages and also more valuable in terms of what they can be used for. For identity keys the same logic is also true, but generally not possible for the simple reason that rotating an identity key means that a re-verification had to occur.

Certificate chains are the exception, where root certificates are trusted unconditionally and therefore subsequently signed intermediate or leaf certificates could be trusted as well. The limiting factor there is however the private key of the root certificate—it cannot be leaked without compromising the overall trust.

While a leaked or compromised private identity key in morphing identity can still be a problem under certain circumstances (discussed below), the system addresses real-life situations (like a lost device) and improves them considerably compared to PGP-like or X.509-based systems.

Temporary Devices

The capabilities of a newly added device can be controlled through the capabilities field. The issuer device can decide whether the subject device should have the rights to add or remove other devices.

This allows a user to add relatively short-lived web sessions as a device. In case of a compromised browser/computer the damage is limited, as the new device does not have the password to authenticate against the backend, nor can it successfully create journal entries to add or remove devices.

Work-Around in Case No Existing Device is Available

There might be situations when users want to add a device to their account, but have no existing device at hand. This could be because no provisioned physical device is at hand, or because the communications app was previously uninstalled, leaving only an inaccessible logical device behind. In that case users have no other choice than to use their login credentials. In this case a new journal will be used, effectively revoking the trust in the previous journal. Once the user has access to previously used devices, they can re-add them to the account under the new journal. The device's identity key need not change for that process.

Extensibility

To support additional functionality, in some embodiments, two fields have been included in the journal entry structure: a format version, enabling to change the format and an extension hash that can be the integrity check of possibly larger objects, if other things should be included and verified later.

In some embodiments, the capabilities field may be extended to accommodate more fine-grained rights.

Leaked/Compromised Keys

If an attacker can obtain the private key of a device that is currently trusted, they can impersonate the user in terms of cryptographic identities. While this is a potential limitation, it is not, however, a practical threat in itself. If the attacker can also obtain the backend credentials of that user, they can also add and remove devices and therefore take over the account.

This situation can however be reverted by the actual user, as long as they are still in possession of backend credentials or can reset their password.

This sort of attack is possible by design, and it assumes a complete compromise of all credentials. The exact point in time of the compromise plays a big role in this scenario: if a device is just lost, but has not yet been compromised, the user can safely remove the compromised device from the journal and ensure the journal changes are propagated to all relevant other devices.

Once a device has been removed, its private identity key becomes less sensible. The only situation where it could be used again, is when the journal distribution has failed, or when a new contact receives the whole journal for the first time and can only verify it with the long-term fingerprint.

The journal forced distribution is addressed by the distribution tag, which makes it impossible for an attacker to delay the distribution without delaying messages.

In case the journal is downloaded for the first time by a new contact, verifying it with only the long-term fingerprint does not cover the case of compromised identity key material. This limitation is however also true for PGP-like systems. A possible mitigation for this scenario would be the regular publication of journal history hashes on a trusted system (e.g., block chains) and a verification of the distribution tags over call verification.

Scalability with Many Temporary Devices

With temporary devices having a relatively short lifetime, by design, adding and removing them from the journal will generate a new journal entry every time. This will cause the journal grow much faster than if it only contains permanent devices.

This may limit the scalability of the journal if temporary devices are added and removed at a high frequency.

This can however be rate-limited both on the client-side and the backend. The assumption is that typically a temporary device is not added more than once a day on average, which should not impact the scalability for many years. This would lead to ~1000 new entries per year. A serialized and compressed journal entry is ~300 bytes of size, so this would amount to ~300 k per year.

Distribution Platform Can Do a DOS Attack

As mentioned previously, the distribution platform can deny relaying messages containing a distribution tag. While this effectively would limit updates of the journal to propagate, it falls within the scope of general DOS attacks any centralized platform can do and is therefore not considered a limitation.

Discussion

Presently preferred exemplary embodiments of the trust extension approaches described herein should meet some or all of the following requirements:

Adding a New Device
- New devices should only be added through device pairing with an existing device, the backend cannot be a trusted party in the process.
- The trust relationship established through pairing needs to be verifiably documented for other devices of the same account and of other accounts.
- Adding a new device should only require that the two devices involved in the pairing to be online. Other existing devices might never go online again and therefore should not be needed in the process.
- Adding a new device should only happen as the result of an explicit user action. There should not be any automatic way to trigger this.
- Adding a new device should leave a visible trace on existing devices of the same account and optionally leave a trace on devices of other accounts.

Removing a Device
- A device can only be removed from another device tied to the account, the backend cannot be a trusted party in the process.
- The only operation the backend is allowed to do is to remove all devices of an account. This will effectively break the established trust relationships between devices and between accounts.
- Other device should stop sending messages to a removed device.
- Other devices should not accept new devices added by a previously removed device.
- Other devices should be informed about the removal.
- Removing a device should leave a visible trace on existing devices of the same account.

Discovery of New Devices
- Messages should contain an indication that devices were added or removed.
- The indication should be similar to an incremental version and identify exactly what devices are in the device list.
- The indication should be part of the message envelope so that the backend cannot modify or suppress it (unless messages are not delivered altogether).
- When messages are sent, the sending device should encrypt the messages for the devices that are in the devices list and add the indication.
- The backend should inform the sending device if the indication is outdated.
- If a device receives an indication (either when sending or receiving messages) that its device list is outdated it should request the missing updates from the backend.

Propagation of Updates of the Device List
- Updates to the device list can only be created by devices tied to the account.
- Updates cannot be created by the backend, therefore they need to be in a tamper-proof format.
- The backend can be trusted to store and distribute updates to the devices list, as modifications from the backend can be detected.
- If the backend refuses to distribute updates of the device list, this can be detected thanks to the indication which is part of the message envelope.

Exemplary embodiments hereof preferably meet some or all of the following:

Verifying devices of one account between each other should happen when a device is added to the account Verifying devices of one account between each other should be possible by only verifying a new device with one of the existing devices, not all of them Verifying devices of one account between each other should be possible by comparing a fingerprint that is significantly shorter than 256 bits There should only be one verification between different accounts that encompasses all devices of each account (i.e., trust extension)

When users verify their accounts, the subsequent addition of new devices should not break the trust provided by the initial verification (i.e., trust extension)

When users verify their accounts, they should also have an indication whether their past communication was safe A verification between accounts should be doable remotely, without the two users neither have to physically meet nor use a secondary secure channel Users should have a single long-term fingerprint that can be shared (e.g., over social media or the web)

Temporary devices should be allowed (with certain limitations)

Users should be able to easily rotate their identity key material at will without breaking the trust relationship between accounts and devices The trust that is established between two devices when one of them is added to the account needs to be extended to other devices of the same account and to other accounts. Extending the trust between two devices that were verified has to fulfill certain formal requirements.

When users want to add a new device they will need an existing device that is already tied to the account to activate the new one. Both devices need to be "paired" by exchanging data, and the user should verify a code, e.g., a short fingerprint-like code, to ensure the pairing is secure, as described in the section titled Device Pairing (above).

Journal Distribution

In light of the tamper-proof nature of the journal, distributing it is not generally a sensitive operation.

The journal can be distributed, e.g., over a cloud architecture, and in plaintext without risking the leakage of sensitive data or metadata. Therefore the distribution mechanisms do not need to be particularly trusted.

However reliability of the distribution remains important if the distribution mechanism is not yet forced to announce updates of the journal to endpoints.

To force the distribution of new journal entries over an unreliable or possibly malicious platform a tag may be added to the message envelope of messages, as described below.

Remote Verification

Users should have the option of verifying their fingerprints and history hashes during a call. Similarly to Device Pairing, calls between users may be authenticated using a coin-flipping protocol over WebRTC (as described above).

To further increase the security and reliability of the journal distribution, journal entries may, in some embodiments, be referenced on blockchain-based crypto currencies/systems.

The digital signatures used in journal entries may be replaced by a zero-knowledge mechanism.

Computing

The services, mechanisms, operations and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 11:
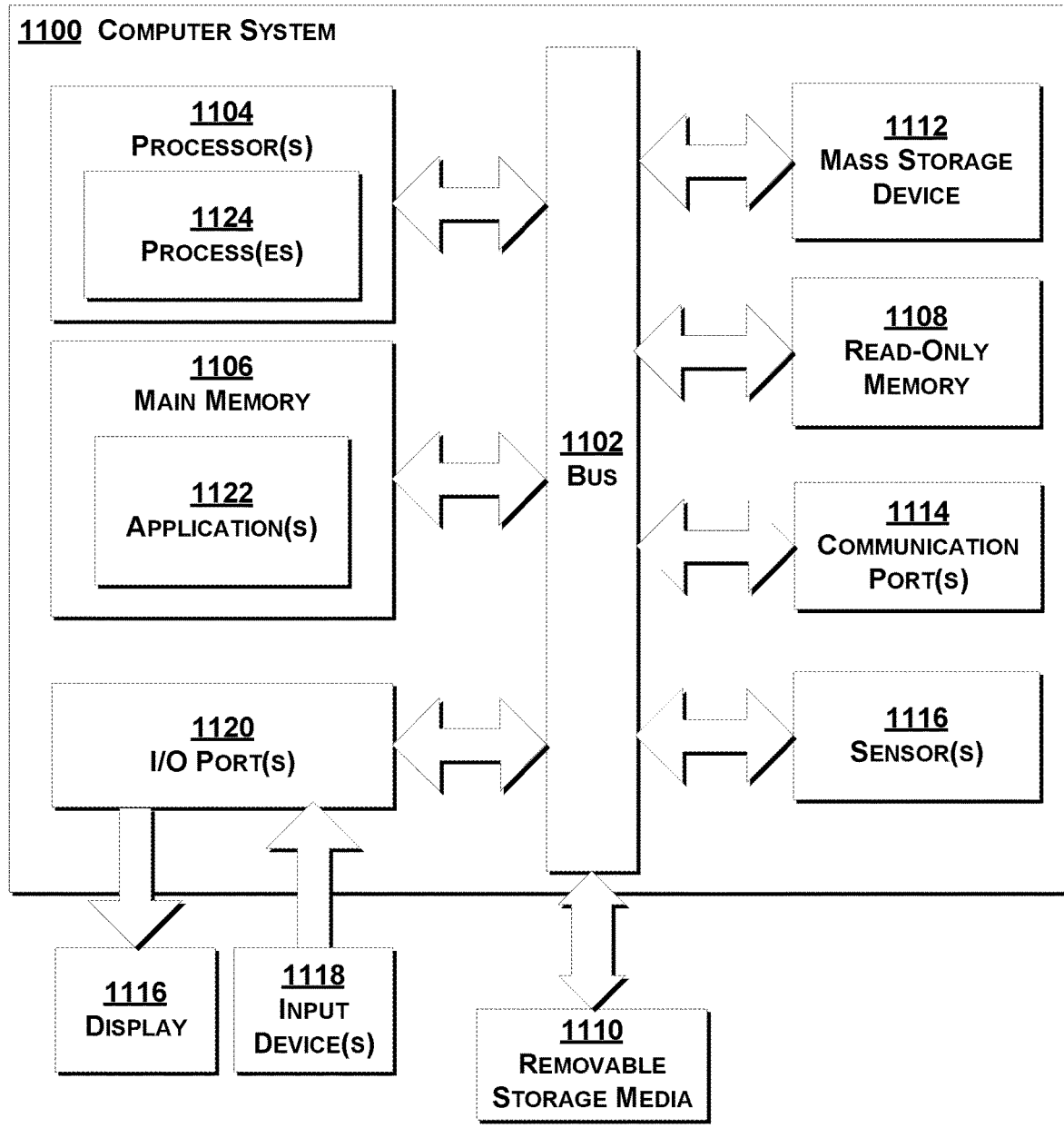
FIG. 11 depicts aspects of computing in accordance with embodiments.

FIG. 11 is a schematic diagram of a computer system 1100 upon which embodiments of the present disclosure may be implemented and carried out.

According to the present example, the computer system 1100 includes a bus 1102 (i.e., interconnect), one or more processors 1104, one or more communications ports 1114, a main memory 1106, removable storage media 1110, read-only memory 1108, and a mass storage 1112. Communication port(s) 1114 may be connected to one or more networks by way of which the computer system 1100 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 1104 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 1114 can be any of an RS-232 port for use with a modem based dial-up connection, a 10/100 Ethernet port, a Gigabit port using copper or fiber, or a USB port, and the like. Communications port(s) 1114 may be chosen depending on a network such as a Local Area Network (LAN), a Wide Area Network (WAN), a CDN, or any network to which the computer system 1100 connects. The computer system 1100 may be in communication with peripheral devices (e.g., display screen 1116, input device(s) 1118) via Input/Output (I/O) port 1120. Some or all of the peripheral devices may be integrated into the computer system 1100, and the input device(s) 1118 may be integrated into the display screen 1116 (e.g., in the case of a touch screen).

Main memory 1106 can be Random Access Memory (RAM), or any other dynamic storage device(s) commonly known in the art. Read-only memory 1108 can be any static storage device(s) such as Programmable Read-Only Memory (PROM) chips for storing static information such as instructions for processor(s) 1104. Mass storage 1112 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 1102 communicatively couples processor(s) 1104 with the other memory, storage and communications blocks. Bus 1102 can be a PCI/PCI-X, SCSI, a Universal Serial Bus (USB) based system bus (or other) depending on the storage devices used, and the like. Removable storage media 1110 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 1106 may be encoded with application(s) 1122 that support(s) the functionality as discussed herein (an application 1122 may be an application that provides some or all of the functionality of one or more of the mechanisms described herein). Application(s) 1122 (and/or other resources as described herein) can be embodied as software code such as data and/or logic instructions (e.g., code stored in the memory or on another computer readable medium such as a disk) that supports processing functionality according to different embodiments described herein.

For example, application(s)/service(s) 1122 may include device application(s) (corresponding to device/client mechanism(s)/service(s) 114 in FIG. 2A), and backend application(s)/service(s) (corresponding to backend mechanism(s)/service(s) 110 in FIGS. 1 and 3).

As shown, e.g., in FIG. 2A, device application(s) 114 (1122-1 in FIG. 7B) may include system/administrative applications/mechanism(s) 126, user interface (UI) applications/mechanism(s) 128, storage applications/mechanism(s) 130, conversation and signaling applications/mechanism(s) 132, verification mechanism(s) 134, and other miscellaneous/auxiliary applications/mechanism(s) 136.

During operation of one embodiment, processor(s) 1104 accesses main memory 1106 via the use of bus 1102 in order to launch, run, execute, interpret or otherwise perform the logic instructions of the application(s) 1122. Execution of application(s) 1122 produces processing functionality of the service(s) or mechanism(s) related to the application(s). In other words, the process(es) 1124 represents one or more portions of the application(s) 1122 performing within or upon the processor(s) 1104 in the computer system 1100.

For example, process(es) 1124 may include device process(es) corresponding to one or more of the device application(s). Similarly, process(es) 1124 may include backend process(es) corresponding to one or more of the backend application(s).

It should be noted that, in addition to the process(es) 1124 that carries(carry) out operations as discussed herein, other embodiments herein include the application 1122 itself (i.e., the un-executed or non-performing logic instructions and/or data). The application 1122 may be stored on a computer readable medium (e.g., a repository) such as a disk or in an optical medium. According to other embodiments, the application 1122 can also be stored in a memory type system such as in firmware, read only memory (ROM), or, as in this example, as executable code within the main memory 1106 (e.g., within Random Access Memory or RAM). For example, application 1122 may also be stored in removable storage media 1110, read-only memory 1108, and/or mass storage device 1112.

Those skilled in the art will understand that the computer system 1100 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Discussion

Thus are described methods, devices, and systems supporting trust extension in a secure communication framework.

The present invention is specified in the claims as well as in the description. The following summary is exemplary and not limiting. Presently preferred embodiments are particularly specified in the claims and the description of various embodiments.

Using the present invention, the efficiency and integrity of a communication framework can be improved.

Embodiments hereof may include some or all of the following features or advantages:

- A trust relationship established through pairing may be verifiably documented for other devices of the same account and of other accounts.
- Adding a new device only requires that the two devices involved in the pairing to be online. Other existing devices might never go online again and therefore needed not be involved in the process.
- Adding a new device may leave a visible trace for transparency purposes on existing devices of the same account and may, optionally, leave a trace on devices of other accounts.
- The only operation the backend is allowed to do is to remove all devices of an account. The backend cannot alter the trust relationship between individual devices.
- Removing a device leaves a visible trace for transparency purposes on existing devices of the same account.
- The journal format is tamper-proof due to a chain of trust. This means that new entries to the journal can only be created by trusted devices (i.e., devices present in the journal).
- A denial-of-service attack by the backend (or the general transportation mechanism) may be detected by using the Distribution Tag mechanism. This means the backend cannot suppress updates to the journal without refusing to deliver all subsequent messages. The latter has a high chance of being noticed by users.
- Each journal may have a long-term fingerprint that users can publish and share, for example, through third-party channels (e.g., websites, social networks, Twitter, email, etc.). This reduces the risk of man-in-the-middle attacks because other parties can verify the fingerprint before starting to communicate.
- Verifying two accounts may be done by just comparing a low-entropy SAS. If the SAS is the same on both sides, this guarantees that no man-in-the-middle attack is presently occurring, has occurred in the past, nor will occur for as long as the same journals are used.
- Verifying two accounts means that all past, present, and future devices belonging to this account are automatically trusted. It also means that devices that were part of the account in the past but were removed are no longer trusted for as long as the same journals are used.
- Verification may be done remotely, e.g., over a voice call. Thus, users may not have to physically meet or have an out-of-band secure channel.
- A high number of devices may be supported, which makes the system suitable for short-lived temporary devices.
- Users may rotate their secret identity key material frequently and may revoke it. Encryption key rotation in encryption systems has become the norm in state-of-the art systems, but was not feasible for identity key material, because identity keys are typically long-lived so that users do not have to exchange them frequently. Key rotation has become a desirable property ever since users have multiple devices that can either be lost (e.g., phones, tablets and laptops) or be more easily individually compromised. As should be appreciated, this aspect is where the morphing identity concept is superior in ease-of-use and security to existing end-to-end encrypted systems (such as PGP, S/MIME, encrypted messengers that use only one identity key across multiple devices, etc.) that all require the user to renew identity keys on all devices in case of compromise/loss of a single device. That entails the user having to redistribute a new key (typically) manually to all peers.

As noted, embodiments hereof may include some or all of the above features or advantages. Not every feature need be present for every embodiment or implementation, and some embodiments or implementations may have none of these features or advantages.

The above list of features and/or advantages are intended to further illustrate aspects of the invention but are not intended to limit its scope in any way.

CONCLUSION

As used in this description, the term "portion" means some or all. So, for example, "A portion of X" may include some of "X" or all of "X". In the context of a conversation, the term "portion" means some or all of the conversation.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

Throughout the description and claims, the terms "comprise", "including," "having," and "contain," and their variations should be understood as meaning "including but not limited to," and are not intended to exclude other components unless specifically so stated.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

Use of exemplary language, such as "for instance," "such as," "for example" ("e.g."), and the like, is merely intended to better illustrate the invention and does not indicate a limitation on the scope of the invention unless specifically so claimed.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A computer-implemented method operable in a communication framework in which each of a plurality of users has one or more devices, and in which users use at least some of their devices to communicate via a backend system,
    wherein the plurality of users include a first user and a second user,
    the method comprising: (A)(1) maintaining, as a first journal in the backend system, a first set comprising two or more trusted devices associated with the first user of the plurality of users, the two or more trusted devices being devices of the first user; and
    (A)(2) maintaining, as a second journal in the backend system, a second set comprising a second two or more trusted devices associated with the second user of the plurality of users, the second two or more trusted devices being devices of the second user; and
    (B) forming a symmetric first trust relationship between a first trusted device in the first set and a second trusted device in the second set; and then
    (C) based on (i) the first trust relationship, and (ii) the first set associated with the first user, and (iii) the second set associated with the second user, forming a symmetric second trust relationship between each device in the first set and each device in the second set; and then
    (D)(1) at least one device in the first set communicating via the backend system with one or more devices in the second set, the communicating based on the second trust relationship, wherein
    for the communicating in (D)(1), the at least one device in the first set uses the second journal to determine which devices of the second user to trust.

2. The method of claim 1, further comprising:
    (E) adding a new device to the first set; and
    (F) the new device in the first set communicating with one or more devices in the second set, the communicating based on the second trust relationship.

3. The method of claim 2 wherein the adding in (E) comprises the new device forming a symmetric trust relationship with at least one device already in the first set.

4. The method of claim 2, further comprising, after adding the new device to the first set in (E),
    (G) at least one device in the second set communicating with one or more devices in the first set, the communicating based on the second trust relationship.

5. The method of claim 1, further comprising:
    (F) removing a particular device from the first set, wherein, in response to the removing, the particular device is removed from a trust relationship with the second set.

6. The method of claim 5, further comprising, after removing the particular device from the first set in (F),
    (G) at least one device in the second set communicating with one or more devices in the first set, the communicating based on the second trust relationship.

7. The method of claim 1, wherein the journal associated with a particular user comprises a history of devices associated with the particular user.

8. The method of claim 7, wherein the history of devices associated with the particular user includes a list of (i) at least some devices added to a particular set associated with the particular user; and (ii) at least some devices removed from the particular set associated with the particular user.

9. The method of claim 8, wherein the history of devices associated with the particular user includes a list of (i) all devices added to the particular set associated with the particular user; and (ii) all devices removed from the particular set associated with the particular user.

10. The method of claim 1, wherein the at least one device in the first set uses information in the second journal to determine which devices of the second user to trust.

11. The method of claim 1, further comprising:
    (D)(2) at least one device in the second set communicating with one or more devices in the first set, the communicating based on the second trust relationship, wherein, for the communicating in (D)(2), the at least one device in the second set uses information in the first journal to determine which devices of the first user to trust.

12. The method of claim 1, wherein the trusted devices are selected from: a computing device, a computer, a mobile phone, a cellular phone, a tablet computer, a desktop computer, a laptop computer, and a set-top box.

13. An article of manufacture comprising a non-transient computer-readable medium having program instructions stored thereon, the program instructions, operable on a device and, when executed by a processor on the device, cause the processor to: perform the method of claim 1.

14. A device, including hardware including at least one processor and at least one memory, the device programmed to perform the method of claim 1.

15. The device of claim 14, wherein the device is selected from: a computing device, a computer, a mobile phone, a cellular phone, a tablet computer, a desktop computer, a laptop computer, and a set-top box.

16. A computer-implemented method operable in a communication framework in which each of a plurality of users has one or more devices, and in which users use at least some of their devices to communicate via a backend system, the method comprising:
(A) forming a symmetric first trust relationship between
   (x) a first trusted device in a first set, the first set consisting of a first two or more trusted devices of a first user of the plurality of users, and
   (y) a second trusted device in a second set, the second set consisting of a second two or more trusted devices of a second user of the plurality of users; and then
(B) based on (i) the first trust relationship, and (ii) the first set, and (iii) the second set,
   forming a symmetric second trust relationship between each device in the first set and each device in the second set; and then
(C) at least one device in the first set communicating via the backend system with one or more devices in the second set, the communicating based on the second trust relationship, and
wherein information about the first set is maintained in a first journal in the backend system, and information about the second set is maintained in a second journal in the backend system.

17. The method of claim 16 wherein for the communicating in (C), the at least one device in the first set uses the second journal to determine which devices of the second user to trust.

18. A device, including hardware including at least one processor and at least one memory, the device programmed to perform the method of claim 16.

19. The device of claim 14, wherein the device is selected from: a computing device, a computer, a mobile phone, a cellular phone, a tablet computer, a desktop computer, a laptop computer, and a set-top box.

20. The method of claim 1, wherein the first trust relationship and the second trust relationship comprise cryptographic trust relationships.

21. The method of claim 16, wherein the first trust relationship and the second trust relationship comprise cryptographic trust relationships.

22. A computer-implemented method operable in a communication framework in which each of a plurality of users has one or more devices, and in which users use at least some of their devices to communicate via a backend system, wherein the plurality of users include a first user and a second user,
the method comprising:
(A)(1) maintaining, as a first journal in the backend system, a first set comprising two or more trusted devices associated with the first user of the plurality of users, the two or more trusted devices being devices of the first user; and
(A)(2) maintaining, as a second journal in the backend system, a second set comprising one or more trusted devices associated with the second user of the plurality of users, the two or more trusted devices being devices of the second user; and
(B) forming a first cryptographic trust relationship between a first trusted device in the first set and a second trusted device in the second set; and then
(C) based on (i) the first cryptographic trust relationship, and (ii) the first set associated with the first user, and
   (iii) the second set associated with the second user, forming second cryptographic trust relationships between each device in the first set and each device in the second set; and then
(D) at least one device in the first set communicating via the backend system with one or more devices in the second set, the communicating based on the second cryptographic trust relationship, wherein
for the communicating in (D), the at least one device in the first set uses the second journal to determine which devices of the second user to trust.

23. A computer-implemented method operable in a communication framework in which each of a plurality of users has one or more devices, and in which users use at least some of their devices to communicate via a backend system, the method comprising:
(A) forming a first cryptographic trust relationship between
   (x) a first trusted device in a first set, the first set comprising a first two or more trusted devices of a first user of the plurality of users, and
   (y) a second trusted device in a second set, the second set comprising two or more trusted devices of a second user of the plurality of users; and then
(B) based on (i) the first cryptographic trust relationship, and (ii) the first set, and (iii) the second set, forming second cryptographic trust relationships between each device in is the first set and each device in the second set; and then
(C) at least one device in the first set communicating via the backend system with one or more devices in the second set, the communicating based on the second cryptographic trust relationships, and
wherein information about the first set is maintained in a first journal in the backend system, and information about the second set is maintained in a second journal in the backend system.

\* \* \* \* \*